United States Patent
Wan et al.

(10) Patent No.: US 12,080,034 B2
(45) Date of Patent: *Sep. 3, 2024

(54) ATTRIBUTE INFORMATION PREDICTION METHOD, ENCODER, DECODER AND STORAGE MEDIUM

(71) Applicant: GUANGDONG OPPO MOBILE TELECOMMUNICATIONS CORP., LTD., Guangdong (CN)

(72) Inventors: Shuai Wan, Dongguan (CN); Lei Wei, Dongguan (CN); Fuzheng Yang, Dongguan (CN); Junyan Huo, Dongguan (CN); Yanzhuo Ma, Dongguan (CN); Lihui Yang, Dongguan (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 0 days.

This patent is subject to a terminal disclaimer.

(21) Appl. No.: 18/300,484

(22) Filed: Apr. 14, 2023

(65) Prior Publication Data
US 2023/0252684 A1  Aug. 10, 2023

Related U.S. Application Data

(63) Continuation of application No. 17/805,093, filed on Jun. 2, 2022, now Pat. No. 11,704,840, which is a
(Continued)

(51) Int. Cl.
*G06T 9/00* (2006.01)
*G06T 7/73* (2017.01)

(52) U.S. Cl.
CPC ............. *G06T 9/001* (2013.01); *G06T 7/75* (2017.01); *G06T 2207/10028* (2013.01); *G06T 2207/20224* (2013.01)

(58) Field of Classification Search
CPC . G06T 9/001; G06T 7/75; G06T 2207/10028; G06T 2207/20224;
(Continued)

(56) References Cited

U.S. PATENT DOCUMENTS

| 2016/0012638 | A1 | 1/2016 | Skrobanski |
| 2019/0080483 | A1* | 3/2019 | Mammou ............... G06T 7/50 |
| 2019/0139266 | A1 | 5/2019 | Budagavi et al. |

FOREIGN PATENT DOCUMENTS

| CN | 105103195 A | 11/2015 |
| CN | 108520470 A | 9/2018 |

(Continued)

OTHER PUBLICATIONS

Office Action of the Indian application No. 202227032837, issued on Sep. 20, 2022.
(Continued)

*Primary Examiner* — Mekonen T Bekele
(74) *Attorney, Agent, or Firm* — PERKINS COIE LLP

(57) ABSTRACT

Provided is a method for predicting attribute information, a coder, a decoder, and a storage medium. The coder determines a current Morton code corresponding to a point to be predicted in a point cloud to be coded, determines a target Morton code corresponding to the point to be predicted based on the current Morton code and according to a preset neighbor information table, judges whether a neighbor point of the point to be predicted exists in the point cloud to be coded according to the target Morton code, and performs prediction to obtain a predicted attribute value of the point to be predicted according to attribute reconstruction information of the neighbor point in response to that the neighbor point exists in the point cloud to be coded.

20 Claims, 19 Drawing Sheets

Related U.S. Application Data continuation of application No. PCT/CN2019/122499, filed on Dec. 2, 2019.

(58) Field of Classification Search
CPC .... G06T 9/004; H04N 19/463; H04N 19/593; H04N 19/88; H04N 19/597; H04N 19/124; H04N 19/50; H04N 19/91; H04N 19/96; H04N 19/13

See application file for complete search history.

(56) References Cited

FOREIGN PATENT DOCUMENTS

| | | |
|---|---|---|
| CN | 109257604 A | 1/2019 |
| CN | 109815842 A | 5/2019 |
| CN | 110312132 A | 10/2019 |
| CN | 110418135 A | 11/2019 |
| WO | 2019055772 A1 | 3/2019 |
| WO | 2019203297 A1 | 10/2019 |

OTHER PUBLICATIONS

English translation of the Written Opinion of the International Search Authority in the international application No. PCT/CN2019/122499, mailed on Aug. 24, 2020.

Non-Final Office Action of the U.S. Appl. No. 17/805,093, issued on Jul. 22, 2022.

Final Office Action of the U.S. Appl. No. 17/805,093, issued on Sep. 27, 2022.

Rongchun Zhang et al."A G-Super4PCS Registration Method for Photogrammetric and TLS Data in Geology", Apr. 28, 2017.

Advisory Action of the U.S. Appl. No. 17/805,093, issued on Dec. 6, 2022.

Supplementary European Search Report in the European application No. 19954841.3, mailed on May 23, 2023. 9 pages.

"G-PCC codec description", 127. MPEG Meeting; Jul. 8, 2019-Jul. 12, 2019; Gothenburg; (Motion Picture Expert Group or ISO/IEC JTC1/SC29/WG11), No. n18673, Sep. 6, 2019 (Sep. 6, 2019), XP030206833, paragraph [3.6; 3.6.1]-paragraph [3.6.7]; figures 35, 36. 62 pages.

Hyejung Hur (LGE) et al: "[G-PCC] [New proposal] on sampling-based LOD generation", 127. MPEG Meeting; Jul. 8, 2019-Jul. 12, 2019; Gothenburg; (Motion Picture Expert Group or ISO/IEC JTC1/SC29/WG11), No. m49424, Jul. 4, 2019 (Jul. 4, 2019), XP030207737, p. 1, paragraph 1-p. 3, paragraph 3.3; figures 1-14. 7 pages.

International Search Report in the international application No. PCT/CN2019/122499, mailed on Aug. 24, 2020.

Notice of Allowance of the Japanese application No. 2022-532617, issued on Jan. 5, 2024, 5 pages with English translation.

First Office Action of the European application No. 19954841.3, issued on Oct. 5, 2023, 6 pages.

Second Office Action of the European application No. 19954841.3, issued on May 29, 2024, 5 pages.

First Office Action of the Chinese application No. 202210909589.1, issued on Jul. 8, 2024, 14 pages with English translation.

\* cited by examiner

| x: | 0<br>000 | 1<br>001 | 2<br>010 | 3<br>011 | 4<br>100 | 5<br>101 | 6<br>110 | 7<br>111 |
|---|---|---|---|---|---|---|---|---|
| y: 0<br>000 | 000000 | 000001 | 000100 | 000101 | 010000 | 010001 | 010100 | 010101 |
| 1<br>001 | 000010 | 000011 | 000110 | 000111 | 010010 | 010011 | 010110 | 010111 |
| 2<br>010 | 001000 | 001001 | 001100 | 001101 | 011000 | 011001 | 011100 | 011101 |
| 3<br>011 | 001010 | 001011 | 001110 | 001111 | 011010 | 011011 | 011110 | 011111 |
| 4<br>100 | 100000 | 100001 | 100100 | 100101 | 110000 | 110001 | 110100 | 110101 |
| 5<br>101 | 100010 | 100011 | 100110 | 100111 | 110010 | 110011 | 110110 | 110111 |
| 6<br>110 | 101000 | 101001 | 101100 | 101101 | 111000 | 111001 | 111100 | 111101 |
| 7<br>111 | 101010 | 101011 | 101110 | 101111 | 111010 | 111011 | 111110 | 111111 |

FIG. 3

|     | x: 0<br>000 | 1<br>001 | 2<br>010 | 3<br>011 |
|---|---|---|---|---|
| y: 0<br>000 | 000000 | 000001 | 000100 | 000101 |
| 1<br>001 | 000010 | 000011 | 000110 | 000111 |
| 2<br>010 | 001000 | 001001 | 001100 | 001101 |
| 3<br>011 | 001010 | 001011 | 001110 | 001111 |

FIG. 4

ATTRIBUTE INFORMATION PREDICTION METHOD, ENCODER, DECODER AND STORAGE MEDIUM

CROSS REFERENCE TO RELATED APPLICATIONS

This is a continuation of U.S. application Ser. No. 17/805,093 filed on Jun. 2, 2022, which is a continuation of International Application No. PCT/CN2019/122499, filed on Dec. 2, 2019, and entitled "ATTRIBUTE INFORMATION PREDICTION METHOD, ENCODER, DECODER AND STORAGE MEDIUM". The disclosure of the applications is hereby incorporated by reference in their entirety.

TECHNICAL FIELD

Embodiments of the present disclosure relate to coding and decoding technologies in the field of communications, and particularly to a method for predicting attribute information, a coder, a decoder, and a storage medium.

BACKGROUND

In a Point Cloud Exploration Model (PCEM)-based coder framework, an input point cloud may be divided into geometric information and attribute information corresponding to each point. The geometric information of the point cloud and the attribute information corresponding to each point are coded separately. When the attribute information of the point cloud is coded, a Morton code corresponding to each point in the point cloud may be obtained by use of coordinate information of the point, and then the attribute information is predicted by a backward differential method based on the Morton code.

There are periodical jump points for Morton codes. Therefore, predicting a current point only by use of a point corresponding to a neighbor Morton code is inaccurate spatially, and may affect the prediction accuracy, result in the defect of great prediction residual, and further reduce the coding efficiency.

BRIEF DESCRIPTION OF THE DRAWINGS

FIG. 3 shows spatial codes of each pixel of an 8×8 image.
FIG. 4 shows spatial codes of each pixel of a 4×4 image.

DETAILED DESCRIPTION

In order to make the characteristics and technical contents of the embodiments of the present disclosure understood in more detail, the implementation of the embodiments of the present disclosure will be described below in combination with the drawings in detail. The appended drawings are only for description as references and not intended to limit the embodiments of the present disclosure.

In a Point cloud exploration model (PCEM)-based coder framework of an Audio Video coding Standard (AVS), an input point cloud may be divided into geometric information and attribute information corresponding to each point. The geometric information of the point cloud and the attribute information corresponding to each point are coded separately.

Figure 1:
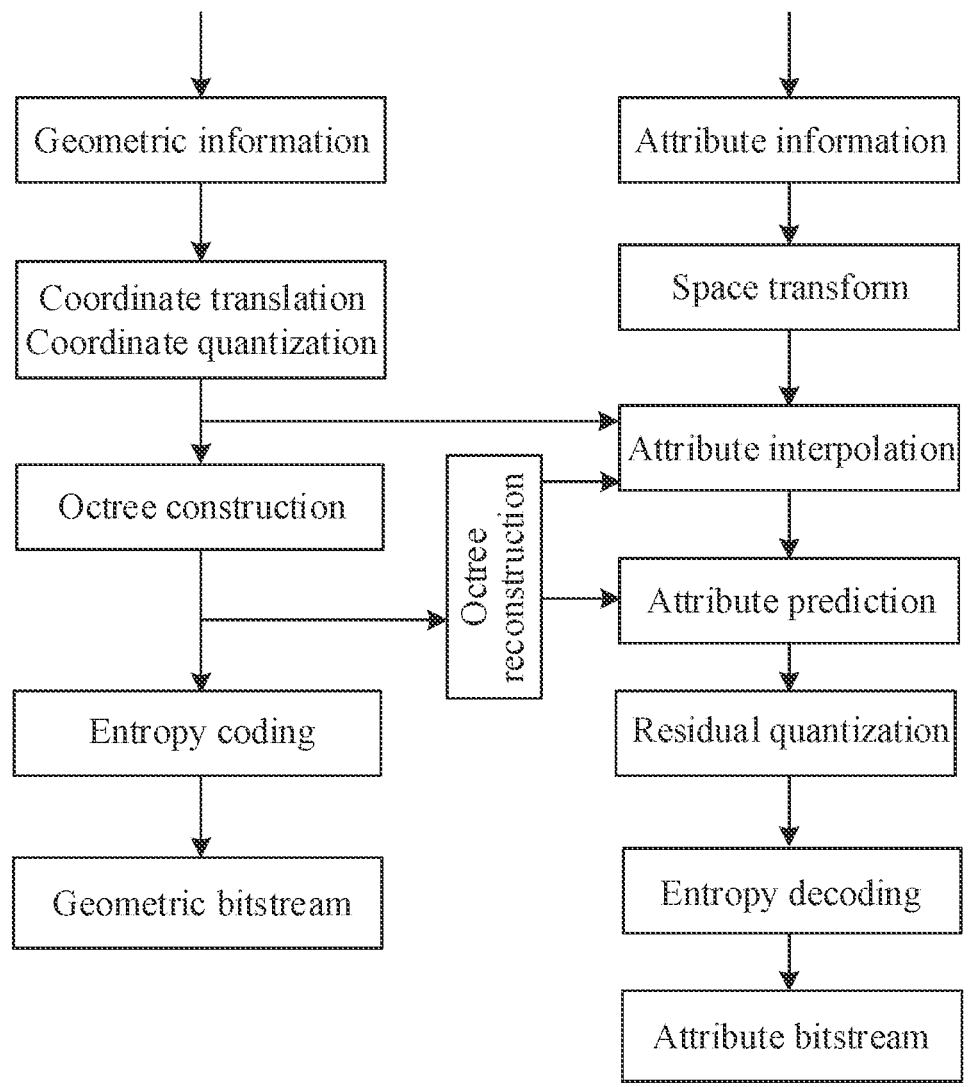
FIG. 1 is a flowchart of PCEM-based coding.

FIG. 1 is a flowchart of PCEM-based coding. As shown in FIG. 1, coordinate conversion is performed on geometric information in a geometric coding process so as to include a complete point cloud in a bounding box. Then, quantization is performed. The quantization mainly implements scaling. Rounding in quantization makes the geometric information of a part of the point cloud the same. Then, whether to remove duplicate points is determined based on parameters. The process of quantization and removal of the duplicate points is also referred to as a voxelization process. Next, octree division is performed on the bounding box. The geometric information may be coded by an octree—based framework and a trisoup-based framework according to different depths of octree division levels.

After the geometric information is coded, the geometric information is reconstructed to guide attribute coding. At present, attribute coding is performed mainly for color information. The color information (i.e., attribute information) is converted from a Red-Green-Blue (RGB) color space to a YUV (Luminance-Chrominance) color space. Then, the point cloud is recolored by use of the reconstructed geometric information so as to correspond the uncoded attribute information to the reconstructed geometric information.

Next, attribute prediction is performed. The point cloud is reordered first based on Morton codes to generate a point cloud sequence applicable to the attribute prediction of the point cloud. Then, the attribute information is predicted by a differential method to obtain an attribute prediction residual. Therefore, quantization coding may continue to be performed on the attribute prediction residual, and the attribute prediction residual is input to an entropy coding engine to obtain a bitstream.

Figure 2:
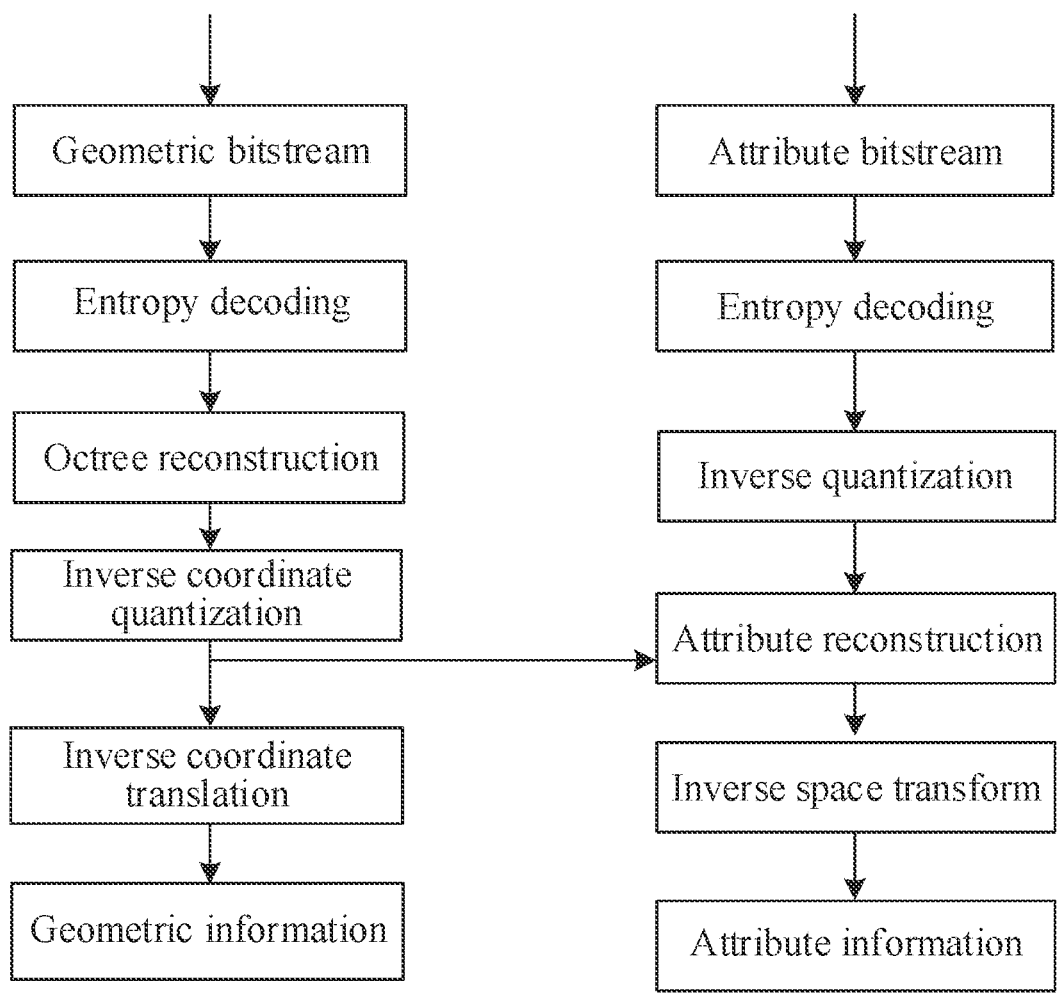
FIG. 2 is a flowchart of PCEM-based decoding.

FIG. 2 is a flowchart of PCEM-based decoding. As shown in FIG. 2, for an obtained binary bitstream, a geometric bit stream and attribute bit stream in the binary bitstream are decoded independently first. When the geometric bit stream is decoded, geometric information of a point cloud is obtained by entropy decoding-octree reconstruction-inverse coordinate quantization-inverse coordination translation. When the attribute bit stream is decoded, attribute information of the point cloud is obtained by entropy decoding-inverse quantization-attribute reconstruction-inverse space transform. A three-dimensional image model of point cloud data to be coded is restored based on the geometric information and the attribute information.

It can be understood that, when the attribute information of the point cloud is being coded, a Morton code corresponding to each point in the point cloud may be obtained by use of coordinate information of the point, and then the attribute information is predicted by a backward differential method based on the Morton code. The Morton code is also referred to as a z-order code because a coding thereof is in a z order spatially. A specific method for calculating a Morton code is described as follows. For a three-dimensional coordinate of which each component is represented by a d-bit binary number, three coordinate components thereof are represented as follows:

$$x = \sum_{l=1}^{d} 2^{d-l} x_l, \quad y = \sum_{l=1}^{d} 2^{d-l} y_l, \quad z = \sum_{l=1}^{d} 2^{d-l} z_l.$$

Where $x_l, y_l, z_l \in \{0,1\}$ represent binary numerical values from a most significant bit (l=1) to a least significant bit (l=d) of x, y, z respectively. The Morton code M is obtained by arranging, for x, y, z, $x_l, y_l, z_l$ alternately in sequence from the most significant bit to the least significant bit. M is calculated through the following formula:

$$M = \sum_{l=1}^{d} 2^{3(d-l)}(4x_l + 2y_l + z_l) = \sum_{l'=1}^{3d} 2^{3d-l'} m_{l'}. \quad (1)$$

Where $m_{l'} \in \{0,1\}$ represents values corresponding to a most significant bit (l'=1) to least significant bit (l'=3d) of M respectively. After the Morton code M corresponding to each point in the point cloud is obtained, the points in the point cloud are arranged according to a sequence of Morton codes from small to large to obtain w, and a weight w corresponding to each point is set to 1. The points are represented as a combination like z|(y<<1)|(x<<2) in a computer language.

Descriptions are made in combination with FIG. 3. Ordering based on high and low bits is described herein taking z, y, x(x|(y<<1)|(z<<2)) as an example.

FIG. 3 shows spatial codes of each pixel of an 8×8 image. As shown in FIG. 3, position coordinates of x and y values at 0 to 7 are coded by one-dimensional binary numbers from 000000 to 111111. Binary coordinate values are interleaved to obtain a binary z-value map. z shapes are obtained by connection in numerical directions to generate recursive z-shaped curves. In the figure, a z value is put at each position according to a connection sequence. In practice, the figure is formed by iteration in a z direction, from 00 to 11 (there is one z in the whole figure), then from 0000 to 1111 (a z is put at each point in the previous z), and then from 000000 to 111111 (a z is put at each point in the previous z), recursively increasing with two bits added every time.

FIG. 4 shows spatial codes of each pixel of a 4×4 image. As shown in FIG. 4, for a Morton code corresponding to a two-dimensional coordinate, x and y coordinates are binarized first. Then, values of high to low bits of x and y are arranged alternately from a most significant bit. Finally, values of Morton codes are connected from small to large values, thereby forming Z-shaped connection sequences. Every four points may be considered as a small block, and except the last two bits, the first four bits thereof are the same. Then, a parent block may be determined for the Morton codes of which the first four bits are the same. In such case, the Morton codes corresponding to the four points may be shifted rightwards by two bits to obtain a Morton code corresponding to the parent block thereof. As such, every four blocks of the same level are continuously combined, namely values of the Morton codes are shifted rightwards by two bits, so as to obtain a parent block thereof. Similarly, under a three-dimensional coordinate, every eight small blocks are combined, namely values of Morton codes are shifted rightwards by three bits, so as to obtain a parent block thereof.

At present, when attribute information is predicted based on a backward differential method, a current point may be predicted by use of a point corresponding to a neighbor Morton code, specifically as follows.

In S1, a Morton-reordered point cloud is traversed. For a first point, there is no reference point for prediction, a predicted value thereof is R0, and an attribute value of the current point is set to A0. In such case, a prediction residual is R0=A0.

In S2, for each of other points, a previous point of the current point in a Morton sequence is taken as a reference point, a reconstructed attribute value A' (i−1) of the reference point is taken as a predicted value, and an attribute value of the current point is set to Ai. In such case, a prediction residual is Ri=Ai-A' (i−1).

In S3, S2 is repeated until the whole frame of point cloud is traversed.

Then, quantization coding may continue to be performed on the attribute prediction residual, and the attribute prediction residual is input to an entropy coding engine to obtain a bitstream.

However, there are periodical jump points for Morton codes. That is, two points corresponding to neighbor Morton codes do not necessarily correspond to neighbor spatial positions. Therefore, predicting a current point only by use of a point corresponding to a neighbor Morton code is inaccurate spatially. That is, predicting attribute information of the current point only by use of a previous Morton code in a PCEM may bring an error, thereby affecting the prediction accuracy.

In order to overcome the foregoing defect, it is proposed in the present disclosure to identify a real neighbor point in stronger correlation with a point to be predicted rapidly by use of a current Morton code corresponding to the point to be predicted and predict attribute information of the point to be predicted by use of a reconstructed attribute value of the neighbor point, thereby improving the coder performance. That is, in the present disclosure, a coder/decoder, when predicting the attribute information of the point to be predicted, may determine a target Morton code corresponding to a neighbor position around the point to be predicted by use of the current Morton code corresponding to the point to be predicted based on a preset neighbor information table. If a neighbor point of the point to be predicted exists at the neighbor position in a point cloud, the coder/decoder may perform prediction to obtain a predicted attribute value of the point to be predicted directly by use of a reconstructed attribute value of the neighbor point. Since the point to be predicted is more closely correlated with the neighbor point, predicting the attribute information of the point to be predicted by use of the neighbor point may improve the prediction accuracy effectively and reduces a prediction residual greatly. Therefore, the coding efficiency is improved.

Figure 5:
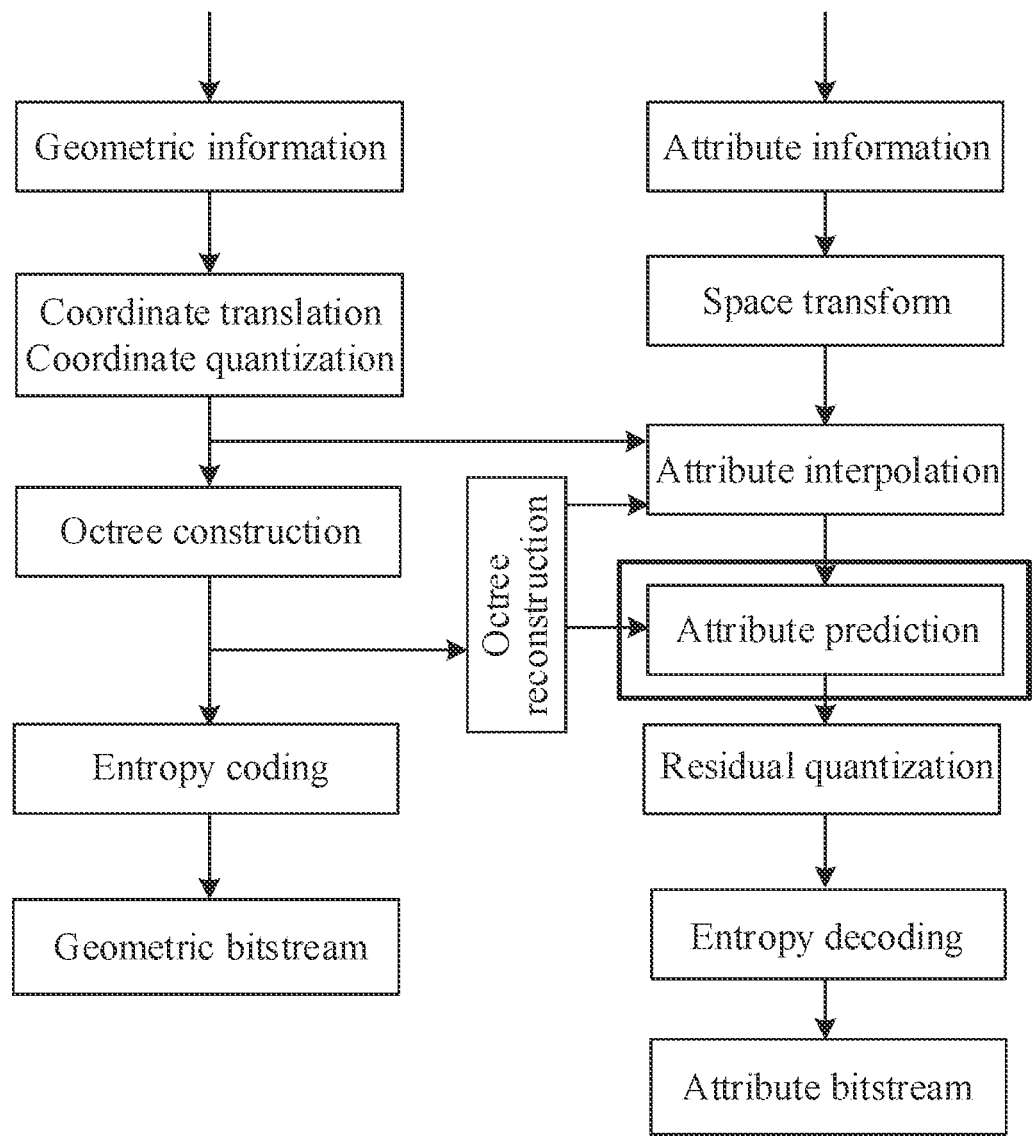
FIG. 5 is a first schematic application diagram of a prediction method.
Figure 6:
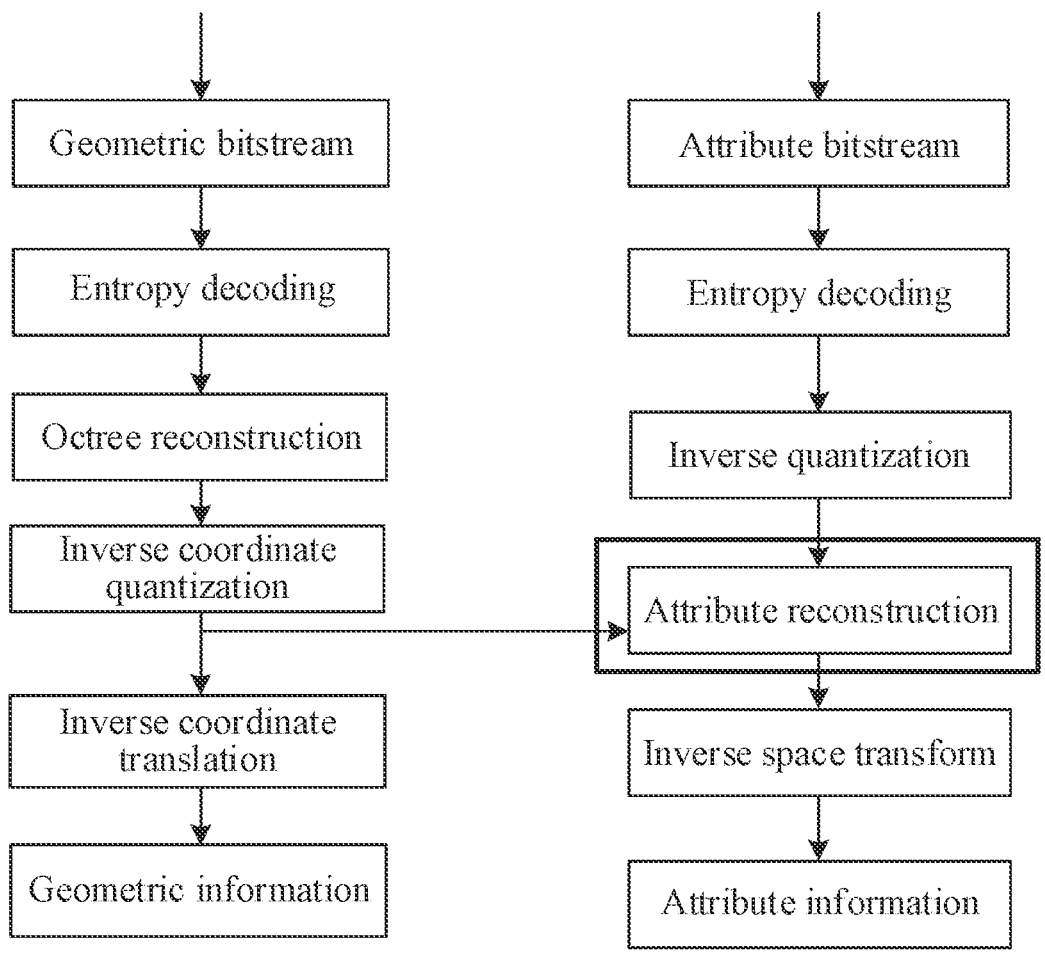
FIG. 6 is a second schematic application diagram of a prediction method.

The method for predicting attribute information disclosed in the present disclosure may affect an attribute prediction process and an attribute reconstruction process in a PCEM-based point cloud coder/decoder framework. Exemplarily, FIG. 5 is a first schematic application diagram of the prediction method. As shown in FIG. 5, the method for predicting attribute information of the present disclosure may be applied to an attribute prediction position in the PCEM-based point cloud coder framework. FIG. 6 is a second schematic application diagram of the prediction method. As shown in FIG. 6, the method for predicting attribute information of the present disclosure may be applied to an attribute reconstruction position in the PCEM-based point cloud decoder framework. Further, the method for predicting attribute information works simultaneously at the coding side and the decoding side. Processes, frameworks, and algorithms in the method for predicting attribute information are completely the same at the coding side and the decoding side.

The technical solutions in the embodiments of the present disclosure will be described clearly and completely below in combination with the drawings in the embodiments of the present disclosure.

Figure 7:
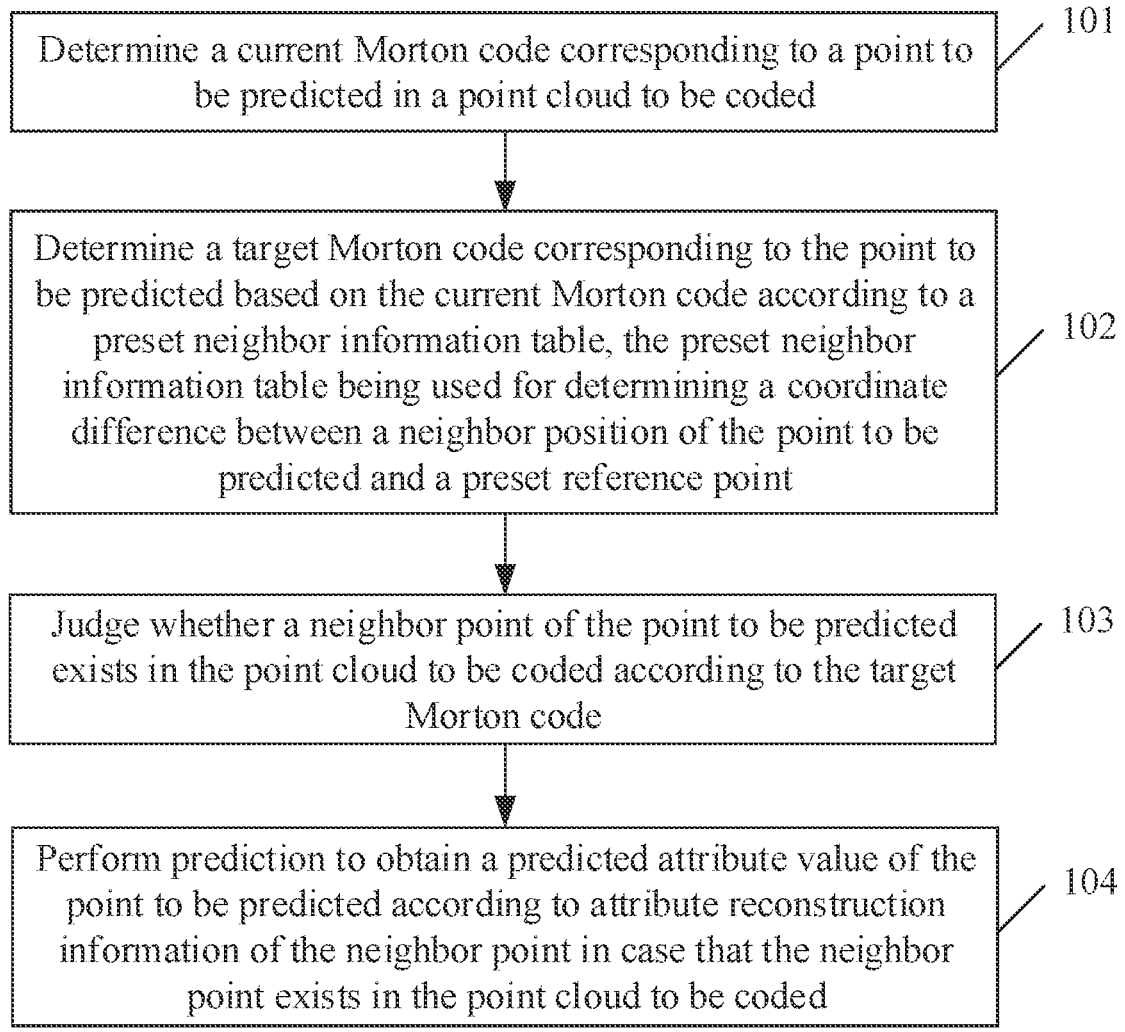
FIG. 7 is a first implementation flowchart of a method for predicting attribute information.

An embodiment of the present disclosure provides a method for predicting attribute information, which is applied to a coder. FIG. 7 is a first implementation flowchart of the method for predicting attribute information. As shown in FIG. 7, the method that the coder predicts attribute information of a point to be predicted may include the following operations.

In S101, a current Morton code corresponding to a point to be predicted in a point cloud to be coded is determined.

In the embodiment of the present disclosure, the coder may determine a current Morton code corresponding to a point to be predicted in a point cloud to be coded first.

It is to be noted that, in the embodiment of the present disclosure, when a coding process is performed on the point cloud to be coded, geometric information of the point cloud to be coded and attribute information corresponding to the point cloud to be coded are coded separately. The geometric information is reconstructed after being coded. The coding of the attribute information depends on reconstructed geometric information.

Specifically, the coding of the attribute information is mainly coding of color information. First, the color information is converted from an RGB color space to a YUV color space. Then, the point cloud is recolored by use of the reconstructed geometric information so as to correspond the uncoded attribute information to the reconstructed geometric information. Next, the attribute information is predicted as follows. The point cloud to be coded is reordered first based on Morton codes to generate a point cloud sequence applicable for the prediction of the attribute prediction of the point cloud to be coded.

Further, in the embodiment of the present disclosure, after the geometric information of the point cloud to be coded is coded, the coder may determine Morton codes corresponding to all points by use of information of the set of all points in the point cloud to be coded. After the Morton codes corresponding to all the points are obtained, the coder may sequence all the Morton codes corresponding to all the points in the point cloud to be coded from small to large Morton codes to generate a point cloud sequence set corresponding to the point cloud to be coded. The point cloud sequence set stores all the Morton codes corresponding to all the points in the point cloud to be coded.

It is to be noted that, in the embodiment of the present disclosure, the coder, when coding the attribute information of the point cloud to be coded, may predict attribute information of all the points in the point cloud to be coded sequentially from small to large Morton codes.

It can be understood that, in the embodiment of the present disclosure, the point to be predicted may be any point in the point cloud to be coded. The current Morton code is a Morton code corresponding to the point to be predicted. When attribute information of the point to be predicted is being predicted, attribute information of another point corresponding to another Morton code smaller than the current Morton code has been predicted, and corresponding attribute reconstruction information has been generated.

Further, in the embodiment of the present disclosure, the coder, when predicting the attribute information of the point to be predicted, needs to determine a Morton code corresponding to the point to be predicted first to obtain the current Morton code.

In S102, a target Morton code corresponding to the point to be predicted is determined based on the current Morton code according to a preset neighbor information table, the preset neighbor information table being used for determining a coordinate difference between a neighbor position of the point to be predicted and a preset reference point.

In the embodiment of the present disclosure, the coder, after determining the current Morton code corresponding to the point to be predicted, may determine a target Morton code corresponding to the point to be predicted based on the current Morton code according to a preset neighbor information table. The target Morton code may represent a Morton code corresponding to a neighbor position around the point to be predicted.

It is to be noted that, in the embodiment of the present disclosure, the preset neighbor information table may represent a coordinate difference between a neighbor position around the point to be predicted and a preset reference point. The neighbor position of the point to be predicted may include a coplanar neighbor point coplanar with and neighboring to the point to be predicted, and/or may include a collinear neighbor point collinear with and neighboring to the point to be predicted.

It can be understood that, in the embodiment of the present disclosure, when the attribute information of the point to be predicted is being predicted, if the point to be predicted is taken as a space center of the point cloud to be coded, the preset reference point may be a coordinate origin of a space centered about the point to be predicted. Specifically, based on the preset reference point, difference calculation may be performed on a distance between the preset reference point and the point to be predicted and a distance between the preset reference point and the neighbor position of the point to be predicted, thereby obtaining a coordinate difference between the neighbor position and the point to be predicted. The preset reference point may be a point corresponding to a minimum Morton code in the point cloud to be coded.

Figure 8:
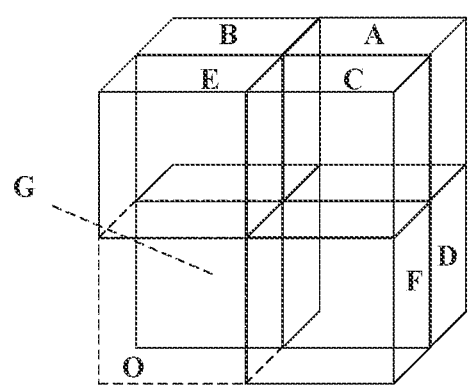
FIG. 8 is a schematic diagram of neighbor positions.

FIG. 8 is a schematic diagram of neighbor positions. As shown in FIG. 8, the preset reference point is 0; the point to be predicted is A; B, C, and D coplanar with and neighboring to A are coplanar neighbor points; and E, F, and G collinear with and neighboring to A are collinear neighbor points.

It can be understood that, in the embodiment of the present disclosure, the coder performs octree division. Therefore, for the point to be predicted, there are 26 neighbor positions around within a unit distance. However, the coder, when coding the attribute information of the point cloud to be coded, predicts the attribute information sequentially from small to large Morton codes. Therefore, the coder only needs to consider a point corresponding to a Morton code smaller than the current Morton code. Exemplarily, only B, C, D, E, F, and G in FIG. 2 need to be considered.

Further, in the embodiment of the present disclosure, the coder, before determining the target Morton code corresponding to the point to be predicted based on the current Morton code according to the preset neighbor information table, needs to establish the preset neighbor information table corresponding to the point to be predicted first. That is, the preset neighbor information table is established based on the point to be predicted.

It is to be noted that, in the embodiment of the present disclosure, the coder, when establishing the preset neighbor information table corresponding to the point to be predicted, may operate the current Morton code (cur_pos) corresponding to the point to be predicted. Specifically, the coder may be positioned to a Morton code (base_pos) corresponding to the preset reference point first. Then, a coordinate difference between the preset reference point and the neighbor position of the point to be predicted is calculated based on the Morton code corresponding to the preset reference point. Next, Morton coding continues to be performed on the coordinate difference. As such, the preset neighbor information table corresponding to the point to be predicted may be established.

That is, in the embodiment of the present disclosure, the neighbor position of the point to be predicted may include a coplanar neighbor point coplanar with and neighboring to the point to be predicted and a collinear neighbor point collinear with and neighboring to the point to be predicted. Therefore, the coder, when establishing the preset neighbor information table corresponding to the point to be predicted, may calculate a first coordinate difference between the preset reference point and the coplanar neighbor point and a second coordinate difference between the preset reference point and the collinear neighbor point respectively. Then, Morton coding may be performed on the first coordinate difference to obtain a coplanar Morton code corresponding to the coplanar neighbor point. Meanwhile, Morton coding may be performed on the second coordinate difference to obtain a collinear Morton code corresponding to the collinear neighbor point. Finally, the coder may establish the preset neighbor information table corresponding to the point to be predicted based on the coplanar Morton code and the collinear Morton code.

Further, in the embodiment of the present disclosure, the coder, after determining the current Morton code corresponding to the point to be predicted in the point cloud to be coded, may determine a target Morton code corresponding to the point to be predicted from a preset neighbor information table corresponding to the current Morton code. The target Morton code may represent a Morton code corresponding to a neighbor position around the point to be predicted.

Specifically, in the embodiment of the present disclosure, when the coder determines the target Morton code corresponding to the point to be predicted based on the current Morton code according to the preset neighbor information table, the preset neighbor information table stores a Morton code obtained by performing Morton coding on a coordinate difference between the preset reference point and the neighbor position. Therefore, the coder may extract the Morton code of the coordinate difference corresponding to the neighbor position from the preset neighbor information table, and then further determine the target Morton code by use of the Morton code of the coordinate difference.

It can be understood that, in the embodiment of the present disclosure, the preset neighbor information table stores a coplanar Morton code and collinear Morton code corresponding to the point to be predicted. Therefore, the coder, when determining the target Morton code, may extract the coplanar Morton code and/or the collinear Morton code from the preset neighbor information table, and then perform a summation operation on the current Morton code and at least one of the coplanar Morton code and the collinear Morton code to obtain the target Morton code.

It is to be noted that, in the embodiment of the present disclosure, the neighbor position of the point to be predicted includes the coplanar neighbor point and the collinear neighbor point. Therefore, the coder, when determining the target Morton code, may determine a neighbor type first. The neighbor type may include coplanar neighbor and collinear neighbor. Then, the coplanar Morton code or the collinear Morton code are further extracted from the preset neighbor information table based on the determined neighbor type. The target Morton code is determined based on the coplanar Morton code or the collinear Morton code.

Exemplarily, in the present disclosure, for the point to be predicted, if a distance between the point to be predicted and the coplanar neighbor point is 1, a distance between the point to be predicted and the collinear neighbor point is $\sqrt{2}$. Based on the principle that the shorter the distance, the stronger the correlation, the neighbor type of coplanar neighbor may be preferred. Then, the coplanar Morton code is extracted from the preset neighbor information table so as to determine the target Morton code by use of the coplanar Morton code.

It is to be noted that, in the embodiment of the present disclosure, the target Morton code may represent the Morton code corresponding to the neighbor position around the point to be predicted. Therefore, the coder may search for and determine a neighbor point around the point to be predicted by use of the target Morton code.

In S103, whether a neighbor point of the point to be predicted exists in the point cloud to be coded is judged according to the target Morton code.

In the embodiment of the present disclosure, the coder, after determining the target Morton code corresponding to the point to be predicted based on the current Morton code according to the preset neighbor information table, may judge whether a neighbor point of the point to be predicted exists in the point cloud to be coded according to the target Morton code. That is, the coder may further determine whether a point neighboring to the point to be predicted exists in the point cloud to be coded by use of the Morton code corresponding to the neighbor position around the point to be predicted.

It is to be noted that, in the embodiment of the present disclosure, the coder, after determining the target Morton code, may not determine the neighbor point of the point to be predicted directly according to the target Morton code. This is because the point cloud is not distributed uniformly in space, and the neighbor point may not really exist at the neighbor position of the point to be predicted. That is, there may not really be in the point cloud to be coded a point corresponding to the target Morton code determined according to the neighbor position of the point to be predicted. Therefore, the coder, after determining the target Morton code, further needs to judge whether the neighbor point of the point to be predicted exists in the point cloud to be coded according to the target Morton code.

It can be understood that, in the embodiment of the present disclosure, the coder, after obtaining a Morton code corresponding to each point, may sequence all the Morton codes corresponding to all the points from small to large Morton codes to generate a point cloud sequence set corresponding to the point cloud to be coded. Therefore, the coder, after determining the target Morton code, may further judge whether the neighbor point of the point to be predicted exists by use of the point cloud sequence set corresponding to the point cloud to be coded and in conjunction with the target Morton code.

Further, in the embodiment of the present disclosure, the coder, when judging whether the neighbor point of the point to be predicted exists in the point cloud to be coded according to the point cloud sequence set and the target Morton code, may obtain the point cloud sequence set of the point cloud to be coded first. Then, a query process may be performed in the point cloud sequence set based on the target Morton code to obtain a query result. If the query result is that the target Morton code exists in the point cloud sequence set, the coder may determine that the neighbor point corresponding to the point to be predicted exists in the point cloud to be coded. That is, in the present disclosure, the coder, after determining the target Morton code, looks up the point cloud sequence set directly to judge whether the target Morton code exists. If YES, it may be determined that the neighbor point of the point to be predicted exists in the space. Correspondingly, if NO, it may be determined that the neighbor point of the point to be predicted does not exist in the space.

It is to be noted that, in the embodiment of the present disclosure, the coder, when performing the query process in the point cloud sequence set based on the target Morton code, may traverse each Morton code in the point cloud sequence set directly according to the target Morton code to obtain the query result, or perform the query process in the point cloud sequence set according to the target Morton code and a preset query algorithm to obtain the query result.

That is, in the embodiment of the present disclosure, the coder, when performing the query process in the point cloud sequence set based on the target Morton code, may traverse the point cloud sequence set, or use another algorithm to quickly look up the point cloud sequence set.

In S104, prediction is performed to obtain a predicted attribute value of the point to be predicted according to attribute reconstruction information of the neighbor point in response to that the neighbor point exists in the point cloud to be coded.

In the embodiment of the present disclosure, the coder, after judging whether the neighbor point of the point to be predicted exists in the point cloud to be coded according to the target Morton code, may predict the attribute information of the point to be predicted directly according to attribute reconstruction information of the neighbor point of the point to be predicted to obtain a predicted attribute value in response to that the neighbor point of the point to be predicted exists in the point cloud to be coded.

It is to be noted that, in the embodiment of the present disclosure, if the neighbor points of the point to be predicted exist, the coder, when performing prediction to obtain the predicted attribute value of the point to be predicted according to the attribute reconstruction information of the neighbor point, may obtain reconstructed attribute values of the neighbor points first. Then, average calculation is performed on the reconstructed attribute values to obtain an average corresponding to the reconstructed attribute values. As such, the average may be determined as the predicted attribute value.

It can be understood that, in the embodiment of the present disclosure, the neighbor point of the point to be predicted may be the coplanar neighbor point coplanar with and neighboring to the point to be predicted or the collinear neighbor point collinear with and neighboring to the point to be predicted. Therefore, if the coder determines that the neighbor point of the point to be predicted is the coplanar neighbor point or the collinear neighbor point, the coder, when obtaining the reconstructed attribute value of the neighbor point, may obtain a first reconstructed attribute value corresponding to the coplanar neighbor point or a second reconstructed attribute value corresponding to the collinear neighbor point.

Correspondingly, in the present disclosure, there is at least one coplanar neighbor point coplanar with and neighboring to the point to be predicted and at least one collinear neighbor point collinear with and neighboring to the point to be predicted. Therefore, the coder, when performing average calculation on the reconstructed attribute value, may calculate a first average corresponding to at least one first reconstructed value or a second average corresponding to at least one second reconstructed value. Finally, the coder may determine the first average or the second average as the predicted attribute value, thereby completing the prediction of the attribute information of the point to be predicted.

Further, in the embodiment of the present disclosure, if the coder determines that the neighbor point of the point to be predicted is the coplanar neighbor point and the collinear neighbor point, the coder, when obtaining the reconstructed attribute value of the neighbor point, may simultaneously obtain a first reconstructed attribute value corresponding to the coplanar neighbor point and a second reconstructed attribute value corresponding to the collinear neighbor point.

Correspondingly, in the present disclosure, there is at least one coplanar neighbor point coplanar with and neighboring to the point to be predicted and at least one collinear neighbor point collinear with and neighboring to the point to be predicted. Therefore, the coder, when performing average calculation on the reconstructed attribute value, may perform weighted average calculation on the first reconstructed attribute value and the second reconstructed attribute value according to preset weights to obtain a weighted average. Finally, the coder may determine the weighted average as the predicted attribute value, thereby completing the prediction of the attribute information of the point to be predicted.

It can be understood that, in the embodiment of the present disclosure, the coder, when performing weighted average calculation on the first reconstructed attribute value and the second reconstructed attribute value according to the preset weights, may allocate different weight values to the first reconstructed attribute value and the second reconstructed attribute value respectively. Specifically, based on the principle that the shorter the distance, the stronger the correlation, the weight value corresponding to the first reconstructed attribute value is greater than that corresponding to the second reconstructed attribute value.

Exemplarily, in the present disclosure, the point to be predicted has multiple neighbor points such as coplanar neighbor points and collinear neighbor points. For example, there are six neighbor points for the prediction of the attribute information of the point to be predicted, including three coplanar neighbor points and three collinear neighbor points. In such case, the coder may perform distance-based weighted average calculation on reconstructed attribute values of all the neighbor points so as to implement the prediction of the attribute information of the point to be predicted to obtain the predicted attribute value of the point to be predicted. Specifically, the coder may predict the attribute information of the point to be predicted by use of the following formula (2):

$$\bar{a}_i = \sum_{j=1}^{n} w_j a_j. \quad (2)$$

Here, $\bar{a}_i$ is the predicted attribute value of the current point, n is the number of neighbor points, valued to 6, $a_j$ is a reconstructed attribute value of the neighbor point, and $w_j$ is a corresponding weight coefficient, and is generally represented by the following formula (3):

$$w_j = \frac{f(d_{ij})}{\sum_{j=1}^{n} f(d_{ij})}. \quad (3)$$

Here, $d_{ij}$ is a distance between the neighbor point and the point to be predicted, and $f(d_{ij})$ is a function related to $d_{ij}$. That is, a correlation between each neighbor point and the point to be predicted is weakened as a distance therebetween decreases. Therefore, a relatively high weight is allocated to a reconstructed attribute value of a neighbor point at a relatively short distance.

It can be understood that, in the embodiment of the present disclosure, the coder, when predicting the attribute information of the point to be predicted, may determine the predicted attribute value of the point to be predicted based on both the first reconstructed attribute value of the coplanar neighbor point of the point to be predicted and the second reconstructed attribute value of the collinear neighbor point, or may select to determine the predicted attribute value of the point to be predicted based on the first reconstructed attribute value of the coplanar neighbor point of the point to be predicted or the second reconstructed attribute value of the collinear neighbor point. Based on the principle that the shorter the distance, the stronger the correlation, the coplanar neighbor point at a shorter distance may be preferred to predict the attribute information of the point to be predicted.

Exemplarily, in the present disclosure, the coder may search for coplanar neighbor points at a distance of 1 first. If the coplanar neighbor points exist, an average of reconstructed attribute values of these coplanar neighbor points is determined as the predicted attribute value of the point to be predicted. If the coplanar neighbor points of the point to be predicted do not exist in the point cloud to be coded, collinear neighbor points at a distance of V continue to be searched. Then, an average of reconstructed attribute values of these collinear neighbor points is determined as the predicted attribute value of the point to be predicted.

Figure 9:
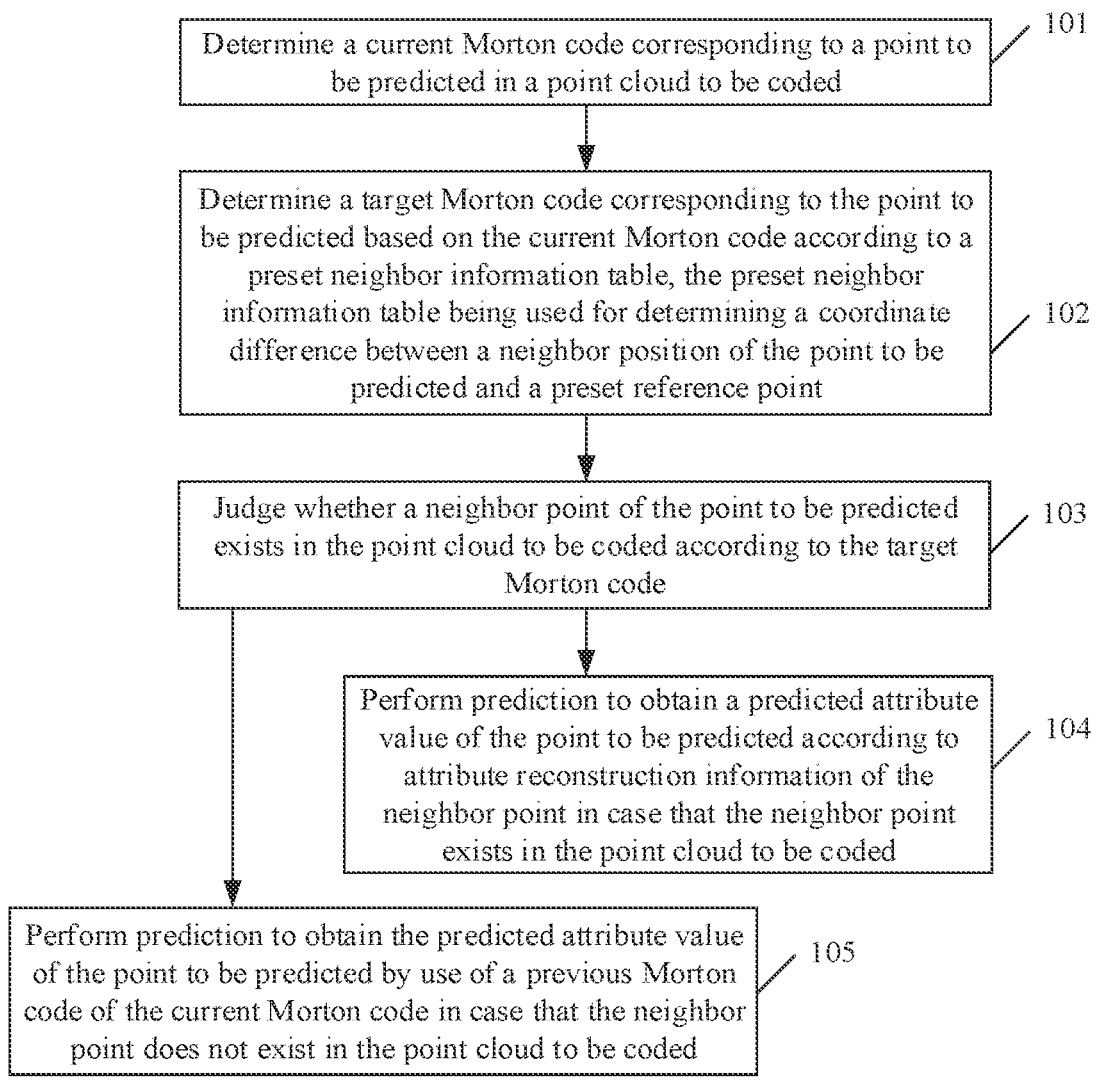
FIG. 9 is a second implementation flowchart of a method for predicting attribute information.

FIG. 9 is a second implementation flowchart of the method for predicting attribute information. As shown in FIG. 9, in the embodiment of the present disclosure, after the coder judges whether the neighbor point exists in the point cloud to be coded according to the target Morton code, namely after S103, the method that the coder predicts attribute information of a point to be predicted may further include the following operation.

In S105, prediction is performed to obtain the predicted attribute value of the point to be predicted by use of a previous Morton code corresponding to the current Morton code in response to that the neighbor point does not exist in the point cloud to be coded.

In the embodiment of the present disclosure, the coder, after judging whether the neighbor point of the point to be predicted exists in the point cloud to be coded according to the target Morton code, may not predict the attribute information of the point to be predicted directly according to the neighbor point of the point to be predicted in response to that the neighbor point of the point to be predicted does not exist in the point cloud to be coded. Therefore, the coder needs to predict the attribute information of the point to be predicted by use of a previous Morton code corresponding to the current Morton code to obtain the predicted attribute value of the point to be predicted.

It is to be noted that, in the embodiment of the present disclosure, the neighbor point does not exist for the point to be predicted. That is, there is no coplanar neighbor point and collinear neighbor point around the point to be predicted. In such case, the attribute information of the point to be predicted may be predicted only by use of a reconstructed attribute value corresponding to the previous Morton code of the current Morton code.

Further, in the embodiment of the present disclosure, the coder, when performing prediction to obtain the predicted attribute value of the point to be predicted by use of the previous Morton code corresponding to the current Morton code, may determine a reconstructed point corresponding to the previous Morton code first from the point cloud to be coded. Then, a reconstructed attribute value of the reconstructed point may be obtained. The reconstructed attribute value of the reconstructed point is determined as the predicted attribute value of the point to be predicted. That is, in the present disclosure, if it is determined based on the target Morton code that the neighbor point of the point to be predicted does not exist in the point cloud to be coded, the reconstructed attribute value of the reconstructed point corresponding to the previous Morton code is determined directly as the predicted attribute value of the point to be predicted, thereby completing the prediction of the attribute information of the point to be predicted.

It can be understood that, in the embodiment of the present disclosure, if the neighbor point of the point to be predicted does not exist in the point cloud to be coded, the coder may search for the previous Morton code of the current Morton code first from a point cloud sequence set of the point cloud to be coded. The point cloud sequence set stores all Morton codes corresponding to all points in the point cloud to be coded according to a sequence from small to large Morton codes.

Figure 10:
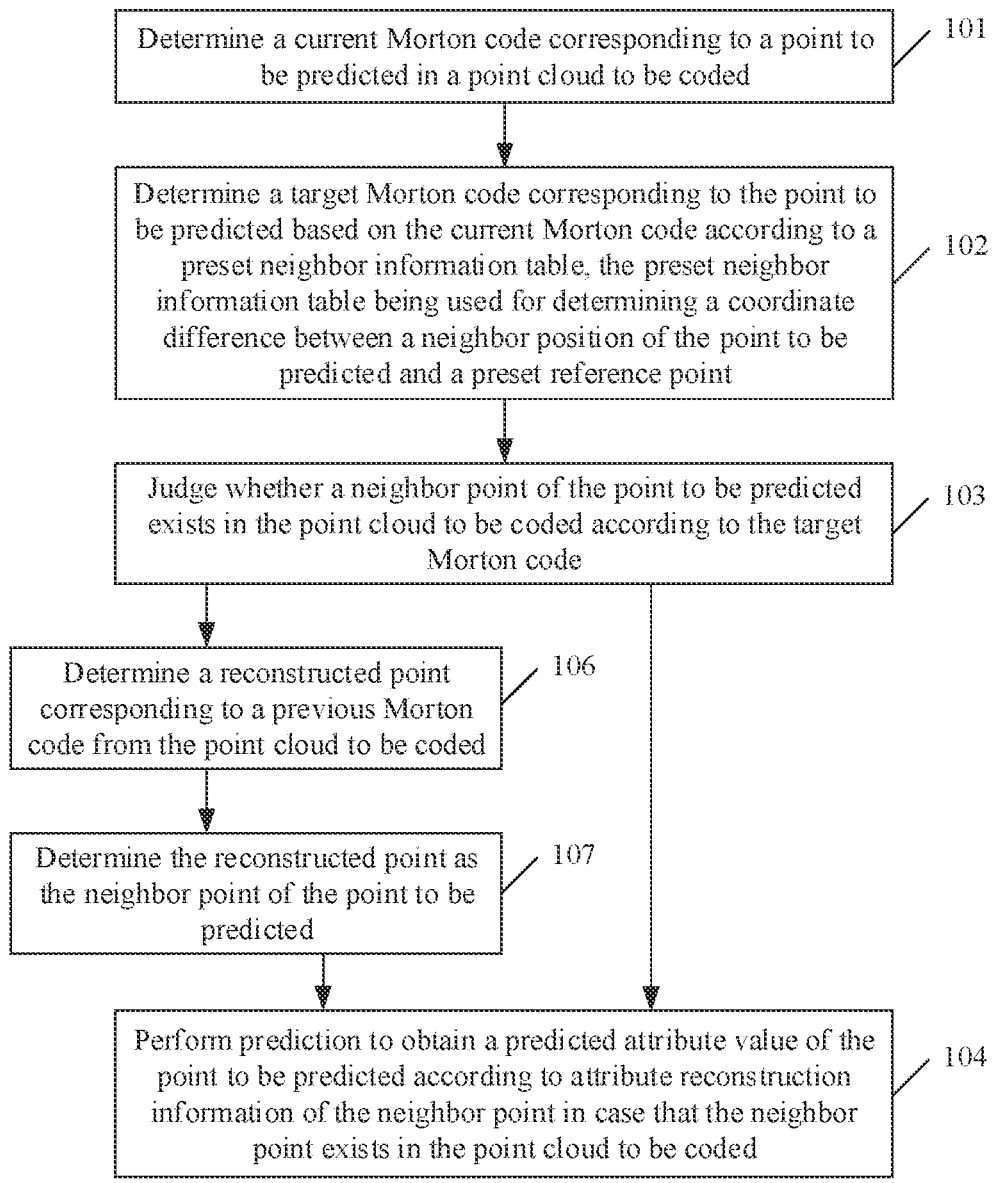
FIG. 10 is a third implementation flowchart of a method for predicting attribute information.

FIG. 10 is a third implementation flowchart of the method for predicting attribute information. As shown in FIG. 10, in the embodiment of the present disclosure, after the coder judges whether the neighbor point exists in the point cloud to be coded according to the target Morton code, namely after S103, and before prediction is performed to obtain the predicted attribute value of the point to be predicted according to the attribute reconstruction information of the neighbor point, namely before S104, the method that the coder predicts attribute information of a point to be predicted may further include the following operations.

In S106, a reconstructed point corresponding to a previous Morton code is determined from the point cloud to be coded.

In S107, the reconstructed point is determined as the neighbor point of the point to be predicted.

In the embodiment of the present disclosure, after the coder judges whether the neighbor point of the point to be predicted exists in the point cloud to be coded according to the target Morton code, if the neighbor point of the point to be predicted does not exist in the point cloud to be coded, namely there is no coplanar neighbor point and collinear neighbor point around the point to be predicted, the coder may determine a reconstructed point corresponding to a previous Morton code first from the point cloud to be coded.

Further, in the embodiment of the present disclosure, the coder, after determining the reconstructed point corresponding to the previous Morton code from the point cloud to be coded, may determine the reconstructed point as the neighbor point of the point to be predicted. That is, in the present disclosure, if it is determined based on the target Morton code that the neighbor point of the point to be predicted does not exist in the point cloud to be coded, the reconstructed point corresponding to the previous Morton code of the current Morton code is directly determined as the neighbor point of the point to be predicted. Then, the attribute information of the point to be predicted continues to be predicted according to the method in S104.

It can be understood that, in the embodiment of the present disclosure, after S103, namely after the coder judges whether the neighbor point exists in the point cloud to be coded according to the target Morton code, if the neighbor point of the point to be predicted exists in the point cloud to be coded, the coder may perform prediction directly to obtain the predicted attribute value of the point to be predicted according to the attribute reconstruction information of the neighbor point. If the neighbor point of the point to be predicted does not exist in the point cloud to be coded, the coder may search for the previous Morton code corresponding to the current Morton code first from the point cloud sequence set of the point cloud to be coded. Then, the reconstructed point corresponding to the previous Morton code is determined from the point cloud to be coded. The reconstructed point is determined as the neighbor point of the point to be predicted. As such, prediction may continue to be performed to obtain the predicted attribute value of the point to be predicted according to the attribute reconstruction information of the neighbor point.

Thus it can be seen that, in the embodiment of the present disclosure, if it is determined based on the target Morton code that the neighbor point of the point to be predicted does not exist in the point cloud to be coded, the coder may determine the reconstructed point corresponding to the previous Morton code of the current Morton code in the point cloud sequence set as the neighbor point of the point to be predicted, and then perform prediction to obtain the predicted attribute value of the point to be predicted according to the attribute reconstruction information of the neighbor point.

Further, in the embodiment of the present disclosure, the coder, after performing prediction to obtain the predicted attribute value of the point to be predicted according to the attribute reconstruction information of the neighbor point, may calculate a prediction residual of the point to be predicted according to the predicted attribute value, and then code the prediction residual to generate a bitstream.

It is to be noted that, in the embodiment of the present disclosure, based on the method including S101 to S107, the coder, when predicting attribute information of a point to be predicted, may determine a target Morton code corresponding to a neighbor position around the point to be predicted by use of a current Morton code corresponding to the point to be predicted based on a preset neighbor information table. If a neighbor point of the point to be predicted exists at the neighbor position in a point cloud, the coder may perform prediction to obtain a predicted attribute value of the point to be predicted directly by use of a reconstructed attribute value of the neighbor point. Since the point to be predicted is correlated with the neighbor point more strongly, predicting the attribute information of the point to be predicted by use of the neighbor point may improve the prediction accuracy effectively. In the present disclosure, a Morton code of the neighbor point is calculated directly according to the current Morton code of the point to be predicted, and if it is determined by query that the neighbor point really exists, the attribute information of the point to be predicted is predicted by use of the reconstructed attribute value of the neighbor point. Compared with a PCEM-based related technical solution, the present disclosure has the advantages that a spatial correlation of the point cloud is used to a greater extent, and output binary bitstreams are reduced greatly while keeping or even improving a Peak Signal to Noise Ratio (PSNR).

Further, in the embodiment of the present disclosure, if the point cloud to be coded is layered, the coder may use the method including S101 to S107 for intra-layer prediction of the point cloud to be coded.

Further, in the embodiment of the present disclosure, according to the method for predicting attribute information disclosed in the present disclosure, the spatial correlation of the point cloud may be used fully, so that the prediction residual is smaller and more applicable to subsequent quantization and entropy coding, and a higher gain may be achieved on the premise of keeping the PSNR. Table 1 shows the performance of the method for predicting attribute information proposed in the present disclosure. It can be seen from Table 1 that, compared with the PCEM-based related technical solution, the method for predicting attribute information d proposed in the present disclosure has the advantages of reducing the code rate and improving the coder performance, under the same objective quality for different targets.

TABLE 1

| Target | Modes | C[0] PSNR | C[1] PSNR | C[2] PSNR | Attributes bpp | Attributes Reduction ratio |
| --- | --- | --- | --- | --- | --- | --- |
| Longdress | Related technical solution | 26.6144 | 36.7162 | 34.3815 | 1.12826 | |
| | Solution of the present disclosure | 26.6275 | 36.7266 | 34.3958 | 0.952644 | 84.43% |

TABLE 1-continued

| Target | Modes | C[0] PSNR | C[1] PSNR | C[2] PSNR | Attributes bpp | Attributes Reduction ratio |
|---|---|---|---|---|---|---|
| basketballplayer | Related technical solution | 36.3657 | 45.4373 | 49.1532 | 0.670583 | |
| | Solution of the present disclosure | 36.4141 | 45.4316 | 49.0278 | 0.52806 | 78.75% |
| Loot | Related technical solution | 34.74 | 49.765 | 48.8853 | 0.741035 | |
| | Solution of the present disclosure | 34.774 | 49.8537 | 49.2958 | 0.610557 | 82.39% |
| redandblack | Related technical solution | 33.9627 | 43.6523 | 33.1759 | 0.833765 | |
| | Solution of the present disclosure | 33.9825 | 43.6714 | 33.1949 | 0.675273 | 80.99% |
| soldier | Related technical solution | 31.3955 | 49.6268 | 49.3881 | 0.981406 | |
| | Solution of the present disclosure | 31.4243 | 49.7115 | 49.5075 | 0.808491 | 82.38% |
| dancer | Related technical solution | 35.2032 | 46.2396 | 49.0288 | 0.722526 | |
| | Solution of the present disclosure | 35.2479 | 46.0737 | 48.9199 | 0.564434 | 78.12% |

The embodiment of the present disclosure provides a method for predicting attribute information. The coder determines a current Morton code corresponding to a point to be predicted in a point cloud to be coded, determines a target Morton code corresponding to the point to be predicted based on the current Morton code according to a preset neighbor information table, the preset neighbor information table being used for determining a coordinate difference between a neighbor position of the point to be predicted and a preset reference point, judges whether a neighbor point of the point to be predicted exists in the point cloud to be coded according to the target Morton code, and performs prediction to obtain a predicted attribute value of the point to be predicted according to attribute reconstruction information of the neighbor point in response to that the neighbor point exists in the point cloud to be coded. Thus, it can be seen that, in the embodiment of the present disclosure, the coder/decoder, when predicting attribute information of a point to be predicted, may determine a target Morton code corresponding to a neighbor position around the point to be predicted by use of a current Morton code corresponding to the point to be predicted based on a preset neighbor information table. If a neighbor point of the point to be predicted exists at the neighbor position in a point cloud, the coder/decoder may perform prediction to obtain a predicted attribute value of the point to be predicted directly by use of a reconstructed attribute value of the neighbor point. Since the point to be predicted is correlated with the neighbor point more strongly, predicting the attribute information of the point to be predicted by use of the neighbor point can improve the prediction accuracy effectively and reduce a prediction residual greatly. Therefore, the coding efficiency is improved.

Figure 11:
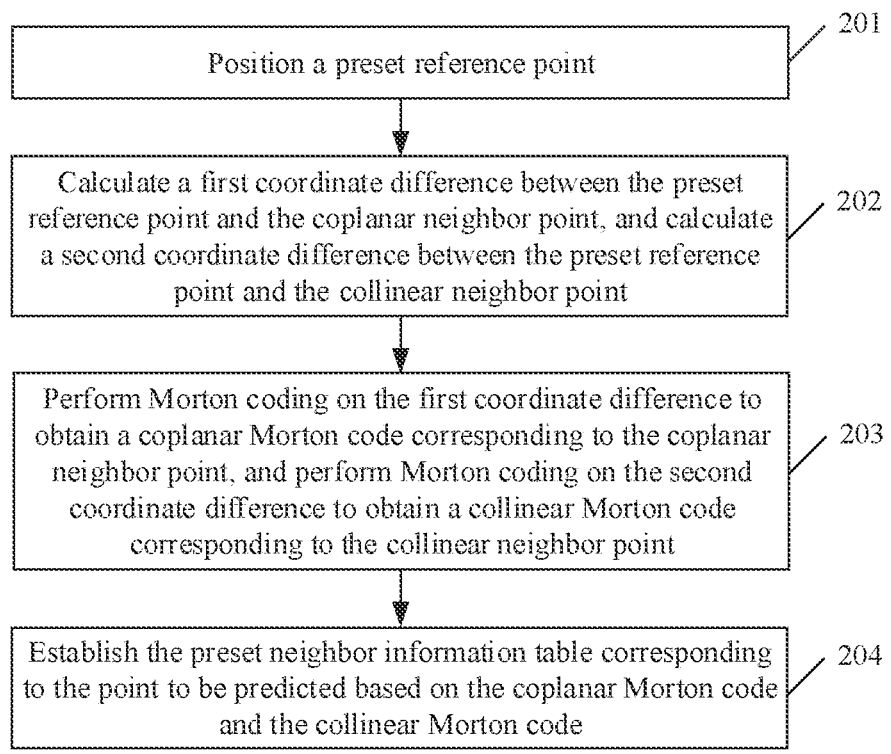
FIG. 11 is a fourth implementation flowchart of a method for predicting attribute information.

Based on the above-mentioned embodiment, in another embodiment of the present disclosure, FIG. 11 is a fourth implementation flowchart of the method for predicting attribute information. As shown in FIG. 11, the neighbor position of the point to be predicted may include a coplanar neighbor point coplanar with and neighboring to the point to be predicted, and may further include a collinear neighbor point collinear with and neighboring to the point to be predicted. Therefore, a method that the coder establishes the preset neighbor information table corresponding to the point to be predicted may include the following operations.

In S201, a preset reference point is positioned.

In S202, a first coordinate difference between the preset reference point and the coplanar neighbor point is calculated, and a second coordinate difference between the preset reference point and the collinear neighbor point is calculated.

In S203, Morton coding is performed on the first coordinate difference to obtain a coplanar Morton code corresponding to the coplanar neighbor point, and Morton coding is performed on the second coordinate difference to obtain a collinear Morton code corresponding to the collinear neighbor point.

In S204, the preset neighbor information table corresponding to the point to be predicted is established based on the coplanar Morton code and the collinear Morton code.

In the embodiment of the present disclosure, the coder, when establishing the preset neighbor information table, needs to position a preset reference point first. The preset reference point represents an origin of coordinates of a space centered about the point to be predicted in the point cloud to be coded. The preset reference point may be a point corresponding to a minimum Morton code in the point cloud to be coded.

Exemplarily, in the present disclosure, a coordinate of the point to be predicted is (1, 1, 2). Taking the point to be predicted as a center of the space, the coder may position a coordinate of the preset reference point to be (0, 0, 0).

It is to be noted that, in the embodiment of the present disclosure, after the preset reference point is positioned, a coordinate of the neighbor position around the point to be predicted may be determined first. For example, a coordinate of a certain neighbor position is determined to be (1, 1, 1).

Further, in the embodiment of the present disclosure, the coordinate difference between the preset reference point and the neighbor position of the point to be predicted may specifically include a first coordinate difference between the preset reference point and the coplanar neighbor point, or may include a second coordinate difference between the preset reference point and the collinear neighbor point.

It is to be noted that, in the embodiment of the present disclosure, the coder, after calculating the coordinate difference between the preset reference point and the neighbor position by use of the preset reference point, may perform Morton coding on the coordinate difference to obtain a corresponding Morton code.

It can be understood that, in the embodiment of the present disclosure, the coder, after calculating the first coordinate difference between the preset reference point and the coplanar neighbor point, may perform Morton coding on the first coordinate difference to obtain a corresponding Morton code, i.e., a coplanar Morton code. Correspondingly, the coder, after calculating the second coordinate difference between the preset reference point and the collinear neighbor point, may perform Morton coding on the second coordinate difference to obtain a corresponding Morton code, i.e., a collinear Morton code.

Further, in the embodiment of the present disclosure, the coder, after completing the Morton coding of the coordinate difference between the preset reference point and the neighbor position, may establish the preset neighbor information table based on the obtained Morton code. Specifically, the coder may establish the preset neighbor information table by use of a correspondence between the neighbor position and the Morton code. That is, the preset neighbor information table may be used for determining the Morton code corresponding to the neighbor position.

It can be understood that, in the embodiment of the present disclosure, the coder may establish the preset neighbor information table corresponding to the point to be predicted based on the coplanar Morton code and the collinear Morton code. Specifically, the coder may store the coplanar neighbor point of the point to be predicted and the corresponding coplanar Morton code in the preset neighbor information table. Meanwhile, the collinear neighbor point of the point to be predicted and the corresponding collinear Morton code may further be stored in the preset neighbor information table. As such, the establishment of the preset neighbor information table is completed.

Figure 12:
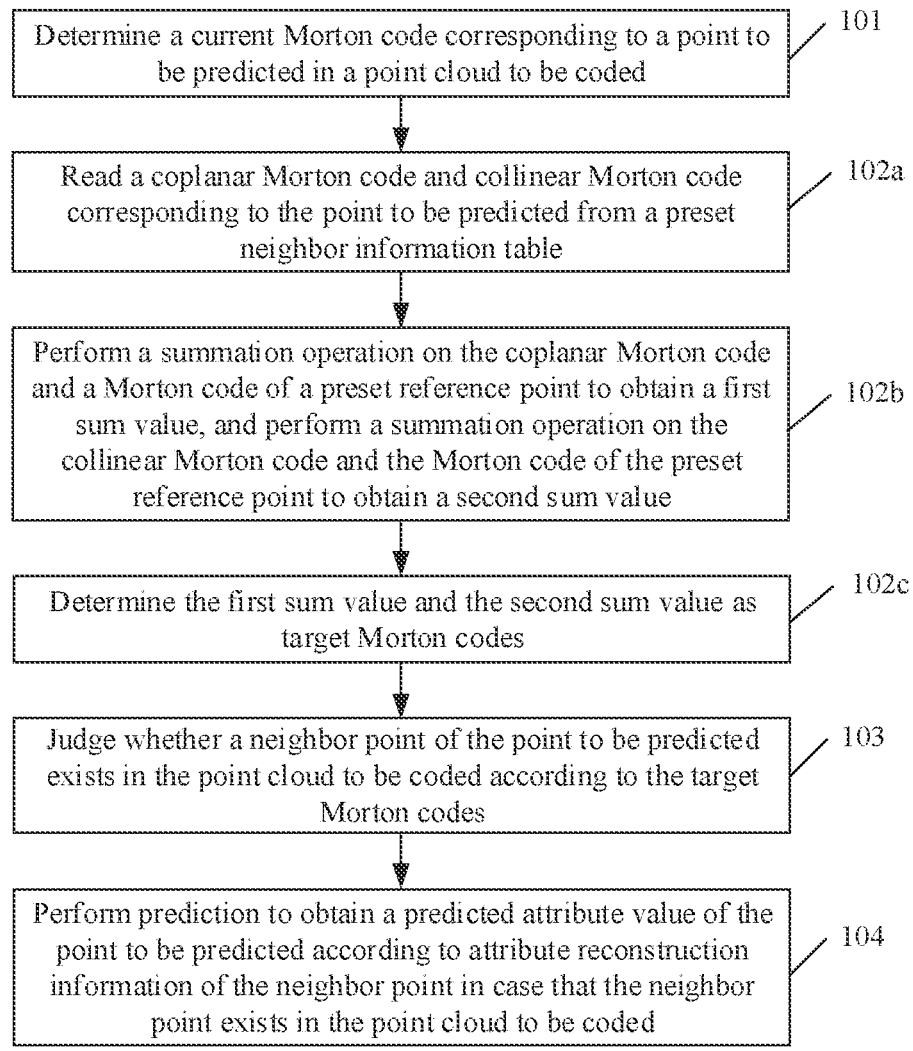
FIG. 12 is a fifth implementation flowchart of a method for predicting attribute information.

Further, in the embodiment of the present disclosure, FIG. 12 is a fifth implementation flowchart of the method for predicting attribute information. As shown in FIG. 12, a method that the coder determines the target Morton code corresponding to the point to be predicted based on the current Morton code and according to the preset neighbor information table may include the following operations.

In S102a, the coplanar Morton code and collinear Morton code corresponding to the point to be predicted are read from the preset neighbor information table.

In S102b, a summation operation is performed on the coplanar Morton code and a Morton code corresponding to the preset reference point to obtain a first sum value, and a summation operation is performed on the collinear Morton code and the Morton code corresponding to the preset reference point to obtain a second sum value.

In S102c, the first sum value and the second sum value are determined as the target Morton code.

In the embodiment of the present disclosure, the coder, when determining the target Morton code by use of the current Morton code and the preset neighbor information table corresponding to the point to be predicted, may read the coplanar Morton code and the collinear Morton code first from the preset neighbor information table. That is, the coder may obtain the Morton code, i.e., the coplanar Morton code, corresponding to the coplanar neighbor point of the point to be predicted first from the preset neighbor information table, and meanwhile, may obtain the Morton code, i.e., the collinear Morton code, corresponding to the collinear neighbor point of the point to be predicted from the preset neighbor information table. Then, the target Morton code may further be determined by use of the coplanar Morton code and the collinear Morton code.

It can be understood that, in the embodiment of the present disclosure, the coder may perform a summation operation on the coplanar Morton code and a Morton code corresponding to the preset reference point to obtain a first sum value. Specifically, since the coplanar Morton code may represent a distance difference between the preset reference point and the coplanar neighbor point, the coder, after adding the coplanar Morton code and the Morton code corresponding to the preset reference point, may obtain the Morton code corresponding to the coplanar neighbor point directly. That is, the first sum value may be determined as the Morton code corresponding to the coplanar neighbor point of the point to be predicted. Therefore, the first sum value may be determined as the target Morton code.

Correspondingly, in the present disclosure, the coder may perform a summation operation on the collinear Morton code and the Morton code corresponding to the preset reference point to obtain a second sum value. Specifically, since the collinear Morton code may represent a distance difference between the preset reference point and the collinear neighbor point, the coder, after adding the collinear Morton code and the Morton code corresponding to the preset reference point, may obtain the Morton code corresponding to the collinear neighbor point directly. That is, the second sum value may be determined as the Morton code corresponding to the collinear neighbor point of the point to be predicted. Therefore, the second sum value may be determined as the target Morton code.

Further, in the embodiment of the present disclosure, before the coder determines the target Morton code corresponding to the point to be predicted based on the current Morton code and according to the preset neighbor information table, namely before S102, the neighbor type of the point to be predicted may be selected to determine whether the neighbor type is a coplanar type or a collinear type. That is, the coder may select to obtain the Morton code corresponding to the coplanar neighbor point of the point to be predicted only, or select to obtain the Morton code corresponding to the collinear neighbor point of the point to be predicted only.

It can be understood that, in the embodiment of the present disclosure, the method that the coder determines the target Morton code corresponding to the point to be predicted based on the current Morton code and according to the preset neighbor information table may include the following operations.

In S102d, the coplanar Morton code corresponding to the point to be predicted is read from the preset neighbor information table in response to that the neighbor type is the coplanar type.

In S102e, a summation operation is performed on the coplanar Morton code and a Morton code corresponding to the preset reference point to obtain a first sum value.

In S102f, the first sum value is determined as the target Morton code.

In the embodiment of the present disclosure, the coder, if selecting the neighbor type of coplanar neighbor first, only needs to read the coplanar Morton code corresponding to the point to be predicted from the preset neighbor information table. Then, a summation operation is performed on the coplanar Morton code and a Morton code corresponding to the preset reference point to obtain a first sum value. Finally, the first sum value may be determined as the target Morton code.

That is, in the embodiment of the present disclosure, if the coder selects to obtain the Morton code corresponding to the coplanar neighbor point of the point to be predicted only, the coder, when determining the target Morton code by use of the current Morton code and the preset neighbor information table corresponding to the point to be predicted, may obtain the coplanar Morton code corresponding to the coplanar neighbor point of the point to be predicted first from the preset neighbor information table. Then, the summation operation may further be performed on the coplanar Morton code and the Morton code corresponding to the preset reference point. Since the coplanar Morton code may represent a distance difference between the preset reference point and the coplanar neighbor point, the coder, after adding the coplanar Morton code and the Morton code corresponding to the preset reference point, may determine the first sum value as the target Morton code.

It can be understood that, in the embodiment of the present disclosure, based on the principle that the shorter the distance, the higher the similarity, the coder may prefer to select the neighbor type of coplanar neighbor. Therefore, output binary bitstreams may be reduced maximally to further improve the coding efficiency on the basis of reducing the prediction residual.

Further, in the embodiment of the present disclosure, the method that the coder determines the target Morton code corresponding to the point to be predicted based on the current Morton code and according to the preset neighbor information table may further include the following operations.

In S102g, the collinear Morton code corresponding to the point to be predicted is read from the preset neighbor information table in response to that the neighbor type is the collinear type.

In S102h, a summation operation is performed on the collinear Morton code and a Morton code corresponding to the preset reference point to obtain a second sum value.

In S102i, the second sum value is determined as the target Morton code.

In the embodiment of the present disclosure, the coder, if selecting the neighbor type of collinear neighbor first, only needs to read the collinear Morton code corresponding to the point to be predicted from the preset neighbor information table. Then, a summation operation is performed on the collinear Morton code and a Morton code corresponding to the preset reference point to obtain a second sum value. Finally, the second sum value may be determined as the target Morton code.

That is, in the embodiment of the present disclosure, if the coder selects to obtain the Morton code corresponding to the collinear neighbor point of the point to be predicted only, the coder, when determining the target Morton code by use of the current Morton code and the preset neighbor information table corresponding to the point to be predicted, may obtain the collinear Morton code corresponding to the collinear neighbor point of the point to be predicted first from the preset neighbor information table. Then, the summation operation may further be performed on the collinear Morton code and the Morton code corresponding to the preset reference point. Since the collinear Morton code may represent a distance difference between the preset reference point and the collinear neighbor point, the coder, after adding the collinear Morton code and the Morton code corresponding to the preset reference point, may determine the second sum value as the target Morton code.

It can be understood that, in the embodiment of the present disclosure, based on the principle that the shorter the distance, the higher the similarity, the coder may prefer to select the neighbor type of collinear neighbor. However, if the coplanar neighbor point coplanar with and neighboring to the point to be predicted does not exist in the point cloud to be coded, the coder may select the neighbor type of collinear neighbor. Therefore, the prediction residual may be reduced maximally to further improve the coding efficiency.

The embodiment of the present disclosure provides a method for predicting attribute information. The coder determines a current Morton code corresponding to a point to be predicted in a point cloud to be coded, determines a target Morton code corresponding to the point to be predicted based on the current Morton code according to a preset neighbor information table, the preset neighbor information table being used for determining a coordinate difference between a neighbor position of the point to be predicted and a preset reference point, judges whether a neighbor point of the point to be predicted exists in the point cloud to be coded according to the target Morton code, and performs prediction to obtain a predicted attribute value of the point to be predicted according to attribute reconstruction information of the neighbor point in response to that the neighbor point exists in the point cloud to be coded. Thus, it can be seen that, in the embodiment of the present disclosure, the coder/decoder, when predicting attribute information of a point to be predicted, may determine a target Morton code corresponding to a neighbor position around the point to be predicted by use of a current Morton code corresponding to the point to be predicted based on a preset neighbor information table. If a neighbor point of the point to be predicted exists at the neighbor position in a point cloud, the coder/decoder may perform prediction to obtain a predicted attribute value of the point to be predicted directly by use of a reconstructed attribute value of the neighbor point. Since the point to be predicted is correlated with the neighbor point more strongly, predicting the attribute information of the point to be predicted by use of the neighbor point can improve the prediction accuracy effectively and reduce a prediction residual greatly. Therefore, the coding efficiency is improved.

Based on the above-mentioned embodiments, in another embodiment of the present disclosure, if the neighbor point of the point to be predicted exists in the point cloud to be coded, the neighbor point may specifically include a coplanar neighbor point coplanar with and neighboring to the point to be predicted, and may further include a collinear neighbor point collinear with and neighboring to the point to be predicted. Therefore, a method that the coder performs prediction to obtain the predicted attribute value of the point to be predicted according to the attribute reconstruction information of the neighbor point may include the following operations.

In S301, in response to that the neighbor point is a coplanar neighbor point coplanar with and neighboring to the point to be predicted, a first reconstructed attribute value corresponding to the coplanar neighbor point is obtained.

In S302, a first average of the first reconstructed attribute value is calculated, and the first average is determined as the predicted attribute value.

In the embodiment of the present disclosure, after the coder judges whether the neighbor point of the point to be predicted exists in the point cloud to be coded according to the target Morton code, if the neighbor point of the point to be predicted exists in the point cloud to be coded, and the existing neighbor point of the point to be predicted is only a coplanar neighbor point coplanar with and neighboring to the point to be predicted, the coder, when obtaining the reconstructed attribute value of the neighbor point, may obtain a first reconstructed attribute value corresponding to the coplanar neighbor point.

Further, in the embodiment of the present disclosure, there is at least one coplanar neighbor point coplanar with and neighboring to the point to be predicted. Therefore, the coder, when performing average calculation on the reconstructed attribute value, may calculate a first average corresponding to at least one first reconstructed value. Then, the coder may determine the first average as the predicted attribute value, thereby completing the prediction of the attribute information of the point to be predicted.

Exemplarily, in the present disclosure, if there are only three coplanar neighbor points for the point to be predicted, the coder may perform average calculation on reconstructed attribute values of all the neighbor points by use of the following formula (4) so as to obtain the predicted attribute value of the point to be predicted:

$$\overline{a}_i = \frac{\sum_{j=1}^{3} a_{1j}}{3} \quad (4)$$

Here, $\overline{a}_i$ is the predicted attribute value of the current point, and $a_{1j}$ is the reconstructed attribute value of the coplanar neighbor point.

Further, in the embodiment of the present disclosure, the method that the coder performs prediction to obtain the predicted attribute value of the point to be predicted according to the attribute reconstruction information of the neighbor point may include the following operations.

In S303, in response to that the neighbor point is a collinear neighbor point collinear with and neighboring to the point to be predicted, a second reconstructed attribute value corresponding to the collinear neighbor point is obtained.

In S304, a second average of the second reconstructed attribute value is calculated, and the second average is determined as the predicted attribute value.

In the embodiment of the present disclosure, after the coder judges whether the neighbor point of the point to be predicted exists in the point cloud to be coded according to the target Morton code, if the neighbor point of the point to be predicted exists in the point cloud to be coded, and the existing neighbor point of the point to be predicted is only a collinear neighbor point collinear with and neighboring to the point to be predicted, the coder, when obtaining the reconstructed attribute value of the neighbor point, may obtain a second reconstructed attribute value corresponding to the collinear neighbor point.

Further, in the embodiment of the present disclosure, there is at least one collinear neighbor point collinear with and neighboring to the point to be predicted. Therefore, the coder, when performing average calculation on the reconstructed attribute value, may calculate a second average corresponding to at least one second reconstructed value. Then, the coder may determine the second average as the predicted attribute value, thereby completing the prediction of the attribute information of the point to be predicted.

Exemplarily, in the present disclosure, if there are only two collinear neighbor points for the point to be predicted, the coder may perform average calculation on reconstructed attribute values of all the neighbor points by use of the following formula (5) so as to obtain the predicted attribute value of the point to be predicted:

$$\overline{a}_i = \frac{\sum_{j=1}^{2} a_{2j}}{2}. \quad (5)$$

Here, $\overline{a}_i$ is the predicted attribute value of the current point, and $a_{2j}$ is the reconstructed attribute value of the collinear neighbor point.

Further, in the embodiment of the present disclosure, the method that the coder performs prediction to obtain the predicted attribute value of the point to be predicted according to the attribute reconstruction information of the neighbor point may include the following operations.

In S305, in response to that the neighbor point includes a coplanar neighbor point coplanar with and neighboring to the point to be predicted and a collinear neighbor point collinear with and neighboring to the point to be predicted, a first reconstructed attribute value corresponding to the coplanar neighbor point and a second reconstructed attribute value corresponding to the collinear neighbor point are obtained.

In S306, weighted average calculation is performed on the first reconstructed attribute value and the second reconstructed attribute value according to preset weights to obtain a weighted average.

In S307, the weighted average is determined as the predicted attribute value.

In the embodiment of the present disclosure, after the coder judges whether the neighbor point of the point to be predicted exists in the point cloud to be coded according to the target Morton code, if the neighbor point of the point to be predicted exists in the point cloud to be coded, and the neighbor point of the point to be predicted includes not only a coplanar neighbor point but also a collinear neighbor point, the coder, when obtaining the reconstructed attribute value of the neighbor point, may simultaneously obtain a first reconstructed attribute value corresponding to the coplanar neighbor point and a second reconstructed attribute value corresponding to the collinear neighbor point.

Further, in the embodiment of the present disclosure, there is at least one coplanar neighbor point coplanar with and neighboring to the point to be predicted and at least one collinear neighbor point collinear with and neighboring to the point to be predicted. Therefore, the coder, when performing average calculation on the reconstructed attribute value, may perform weighted average calculation on the first reconstructed attribute value and the second reconstructed attribute value according to preset weights to obtain a weighted average. The coder may allocate different weight values to the first reconstructed attribute value and the second reconstructed attribute value respectively based on the principle that the shorter the distance, the stronger the correlation. Specifically, the weight value corresponding to the first reconstructed attribute value is greater than that corresponding to the second reconstructed attribute value.

That is, in the present disclosure, the coder, when predicting the attribute information of the point to be predicted, may determine the predicted attribute value of the point to be predicted based on both the first reconstructed attribute value of the coplanar neighbor point of the point to be predicted and the second reconstructed attribute value of the collinear neighbor point, or may select to determine the predicted attribute value of the point to be predicted based on the first reconstructed attribute value of the coplanar neighbor point of the point to be predicted or based on the second reconstructed attribute value of the collinear neighbor point. For example, the coder may search for coplanar neighbor points at a distance of 1 first. If the coplanar neighbor points exist, an average of reconstructed attribute values of these coplanar neighbor points is determined as the predicted attribute value of the point to be predicted. If the coplanar neighbor points of the point to be predicted do not exist in the point cloud to be coded, collinear neighbor points at a distance of $\sqrt{2}$ continue to be searched. Then, an average of reconstructed attribute values of these collinear neighbor points is determined as the predicted attribute value of the point to be predicted.

The embodiment of the present disclosure provides a method for predicting attribute information. The coder determines a current Morton code corresponding to a point to be predicted in a point cloud to be coded, determines a target Morton code corresponding to the point to be predicted based on the current Morton code according to a preset neighbor information table, the preset neighbor information table being used for determining a coordinate difference between a neighbor position of the point to be predicted and a preset reference point. The coder judges whether a neighbor point of the point to be predicted exists in the point cloud to be coded according to the target Morton code, and performs prediction to obtain a predicted attribute value of the point to be predicted according to attribute reconstruction information of the neighbor point in response to that the neighbor point exists in the point cloud to be coded. Thus, it can be seen that, in the embodiment of the present disclosure, the coder/decoder, when predicting attribute information of a point to be predicted, may determine a target Morton code corresponding to a neighbor position around the point to be predicted by use of a current Morton code corresponding to the point to be predicted based on a preset neighbor information table. If a neighbor point of the point to be predicted exists at the neighbor position in a point cloud, the coder/decoder may perform prediction to obtain a predicted attribute value of the point to be predicted directly by use of a reconstructed attribute value of the neighbor point. Since the point to be predicted is correlated with the neighbor point more strongly, predicting the attribute information of the point to be predicted by use of the neighbor point can improve the prediction accuracy effectively and reduce a prediction residual greatly. Therefore, the coding efficiency is improved.

Figure 13:
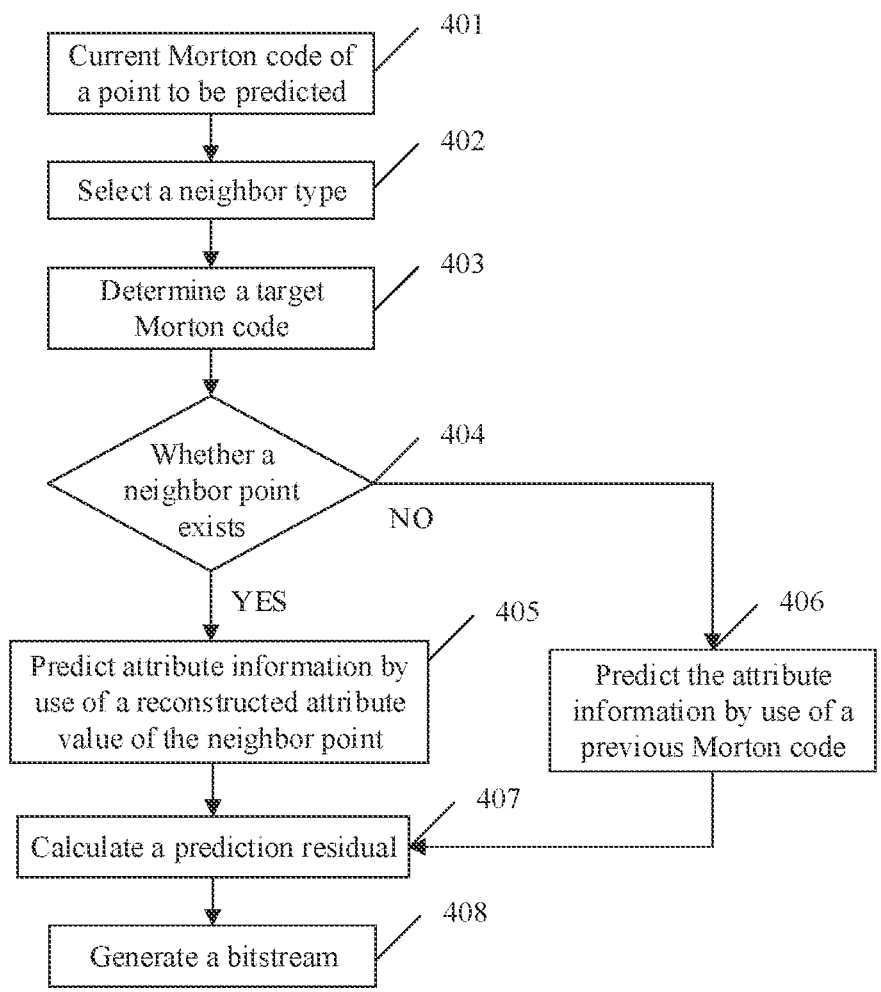
FIG. 13 is a schematic diagram of an attribute information prediction framework.

Based on the above-mentioned embodiments, in another embodiment of the present disclosure, FIG. 13 is a schematic diagram of an attribute information prediction framework. As shown in FIG. 13, a method that the coder predicts attribute information by use of a current Morton code may include the following operations.

In S401, a current Morton code corresponding to a point to be predicted is calculated.

The coder may determine a Morton code, i.e., a current Morton code, corresponding to a point to be predicted in a point cloud to be coded first.

In S402, a neighbor type of a neighbor point is selected.

It can be understood that, in the embodiment of the present disclosure, the coder may select the neighbor type before determining a target Morton code corresponding to a neighbor point. The neighbor type may include a coplanar type and a collinear type. Then, a coplanar Morton code or a collinear Morton code is further selected to be obtained based on the neighbor type.

It is to be noted that, in the embodiment of the present disclosure, the coder is yet unable to determine whether the neighbor point of the point to be predicted exists in the point cloud to be coded before S404. Therefore, the neighbor point herein is based on such a hypothesis that there is a point at a neighbor position around the point to be predicted.

In S403, a target Morton code corresponding to the neighbor point is determined based on the neighbor type.

If the neighbor type selected by the coder is coplanar neighbor, a coplanar Morton code corresponding to a coplanar neighbor point may be obtained from a preset neighbor information table that is pre-established, and is determined as a target Morton code. If the neighbor type selected by the coder is collinear neighbor, a collinear Morton code corresponding to a collinear neighbor point may be obtained from the preset neighbor information table that is pre-established, and is determined as the target Morton code.

In S404, whether the neighbor point exists is judged. If YES, S405 is performed. If NO, S406 is performed.

The coder may judge whether the neighbor point exists in the point cloud to be coded by use of the target Morton code. Specifically, the coder may perform a query process in a point cloud sequence set of the point cloud to be coded. That is, the point cloud sequence set is directly searched to judge whether the target Morton code exists. If YES, it may be determined that the neighbor point of the point to be predicted exists in the space. Correspondingly, if NO, it may be determined that the neighbor point of the point to be predicted does not exist in the space.

In S405, attribute information of the point to be predicted is predicted by use of a reconstructed attribute value of the neighbor point.

If the neighbor point of the point to be predicted exists in the point cloud to be coded, the coder obtains a predicted attribute value of the point to be predicted directly according to attribute reconstruction information of the neighbor point of the point to be predicted. The coder may perform average calculation on a reconstructed attribute value of the neighbor point, and determine an average of the reconstructed attribute value as the predicted attribute value.

In S406, the attribute information of the point to be predicted is predicted by use of a previous Morton code corresponding to the current Morton code.

If the neighbor point of the point to be predicted does not exist in the point cloud to be coded, the coder needs to obtain a predicted attribute value of the point to be predicted by use of a previous Morton code of the current Morton code. The coder may determine a reconstructed point corresponding to the previous Morton code. Then, a reconstructed attribute value of the reconstructed point may be obtained. The reconstructed attribute value of the reconstructed point is determined as the predicted attribute value of the point to be predicted.

In S407, a prediction residual corresponding to the point to be predicted is calculated.

In S408, a bitstream is generated.

The coder, after obtaining the predicted attribute value of the point to be predicted by prediction, may calculate a prediction residual by use of the predicted attribute value. Then, the prediction residual is coded to obtain and output a binary bitstream.

Figure 14:
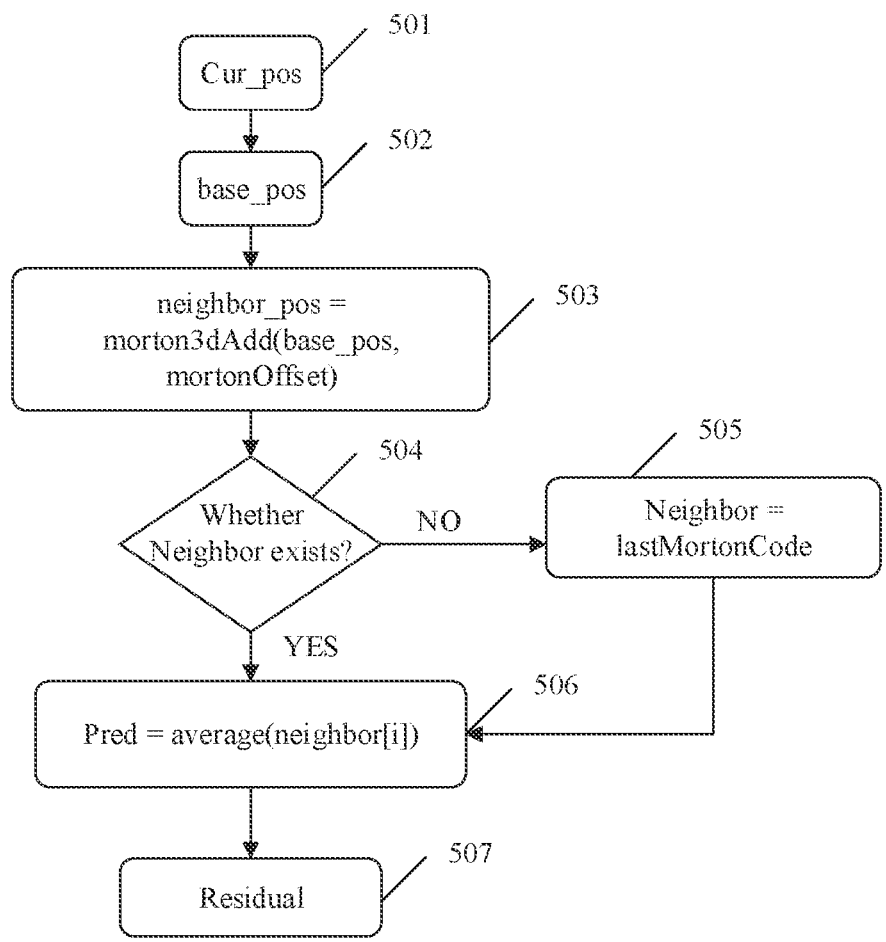
FIG. 14 is a flowchart of an attribute information prediction algorithm.

In the embodiment of the present disclosure, as another exemplary implementation mode of predicting attribute information, FIG. 14 is a flowchart of an attribute information prediction algorithm. As shown in FIG. 14, a specific implementation process that the coder predicts attribute information may include the following operations.

In S501, a current Morton code Cur_pos corresponding to a point to be predicted is determined.

The coder may determine a Morton code, i.e., a current Morton code Cur_pos, corresponding to a point to be predicted in a point cloud to be coded first.

In S502, a Morton code base_pos corresponding to a preset reference point is positioned.

The coder operates Cur_pos to position a Morton code base_pos corresponding to a preset reference point. The coder may calculate a coordinate difference between the reference point base_pos and a neighbor point of the point to be predicted in advance, perform Morton coding on the difference, and establish a preset table.

In S503, a target Morton code neighbor_pos corresponding to a neighbor point is calculated based on base_pos.

The coder may perform Morton code addition according to the preset table to calculate a target Morton code corresponding to each neighbor position of the point to be predicted. Specifically, the coder may calculate neighbor_pos by Morton code addition based on base_pos, where neighbor_pos=morton3dAdd(base_pos, mortonOffset), and MortonOffset represents the coordinate difference after Morton coding.

In S504, search is performed based on neighbor_pos to judge whether the neighbor point Neighbor exists. If YES, S506 is directly performed. If NO, S505 is performed first, and then S506 is performed.

The coder may judge whether the neighbor point exists in the point cloud to be coded by use of the target Morton code. Specifically, the coder may perform a query process in a point cloud sequence set of the point cloud to be coded. That is, the point cloud sequence set is directly searched to judge whether the target Morton code exists. If YES, it may be determined that the neighbor point of the point to be predicted exists in the space. Correspondingly, if NO, it may be determined that the neighbor point of the point to be predicted does not exist in the space.

In S505, a point corresponding to a previous Morton code lastMortonCode of the current Morton code is determined as the neighbor point of the point to be predicted.

If the neighbor point of the point to be predicted does not exist in the point cloud to be coded, the coder needs to predict attribute information of the point to be predicted by use of a previous Morton code LastMortonCode of the current Morton code. Specifically, the previous Morton code may be determined as a Morton code of the neighbor point of the point to be predicted. That is, a point corresponding to the previous Morton code lastMortonCode of the current Morton code is determined as the neighbor point of the point to be predicted. Here, Neighbor-lastMortonCode.

In S506, a predicted attribute value Pred of the point to be predicted is determined by use of a reconstructed value neighbor[i] of the neighbor point.

The coder obtains a predicted attribute value of the point to be predicted according to attribute reconstruction information of the neighbor point of the point to be predicted. The coder may perform average calculation on a reconstructed attribute value neighbor[i] of the neighbor point, and determine an average of the reconstructed attribute value as the predicted attribute value. Specifically, Pred=average(neighbor[i]).

In S507, a prediction residual Residual of the point to be predicted is calculated based on Pred.

The coder, after obtaining the predicted attribute value of the point to be predicted by prediction, may calculate a prediction residual by use of the predicted attribute value. Then, the prediction residual is coded to generate and output an attribute bitstream.

Thus it can be seen that, in the embodiment of the present disclosure, if it is determined based on the target Morton code that the neighbor point of the point to be predicted does not exist in the point cloud to be coded, the coder may determine a reconstructed point corresponding to the previous Morton code of the current Morton code in the point cloud sequence set as the neighbor point of the point to be predicted, and then perform prediction to obtain the predicted attribute value of the point to be predicted according to the attribute reconstruction information of the neighbor point.

The embodiment of the present disclosure provides a method for predicting attribute information. The coder determines a current Morton code corresponding to a point to be predicted in a point cloud to be coded, determines a target Morton code corresponding to the point to be predicted based on the current Morton code according to a preset neighbor information table, the preset neighbor information table being used for determining a coordinate difference between a neighbor position of the point to be predicted and a preset reference point. The coder judges whether a neighbor point of the point to be predicted exists in the point cloud to be coded according to the target Morton code, and performs prediction to obtain a predicted attribute value of the point to be predicted according to attribute reconstruction information of the neighbor point in response to that the neighbor point exists in the point cloud to be coded. Thus, it can be seen that, in the embodiment of the present disclosure, the coder/decoder, when predicting attribute information of a point to be predicted, may determine a target Morton code corresponding to a neighbor position around the point to be predicted by use of a current Morton code corresponding to the point to be predicted based on a preset neighbor information table. If a neighbor point of the point to be predicted exists at the neighbor position in a point cloud, the coder/decoder may perform prediction to obtain a predicted attribute value of the point to be predicted directly by use of a reconstructed attribute value of the neighbor point. Since the point to be predicted is correlated with the neighbor point more strongly, predicting the attribute information of the point to be predicted by use of the neighbor point can improve the prediction accuracy effectively and reduce a prediction residual greatly. Therefore, the coding efficiency is improved.

Figure 15:
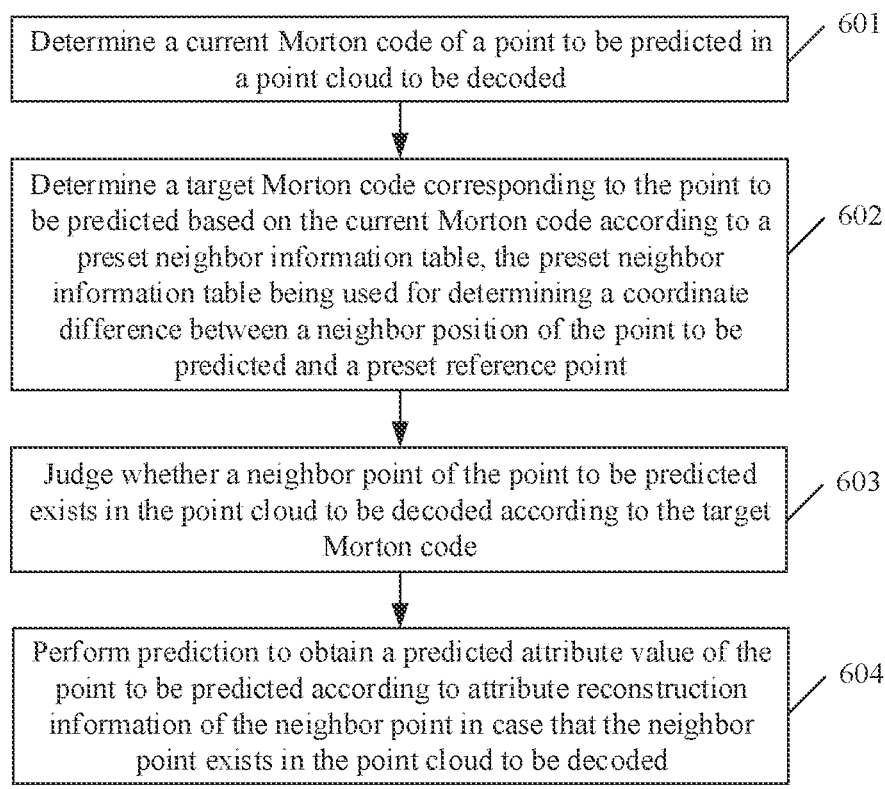
FIG. 15 is a sixth implementation flowchart of a method for predicting attribute information.

An embodiment of the present disclosure provides a method for predicting attribute information, which is applied to a decoder. FIG. 15 is a sixth implementation flowchart of the method for predicting attribute information. As shown in FIG. 15, the method that the decoder predicts attribute information of a point to be predicted may include the following operations.

In S601, a current Morton code corresponding to a point to be predicted in a point cloud to be decoded is determined.

In the embodiment of the present disclosure, the decoder may determine a current Morton code corresponding to a point to be predicted in a point cloud to be decoded first.

It is to be noted that, in the embodiment of the present disclosure, when a decoding process is performed on the point cloud to be decoded, geometric information of the point cloud to be decoded and attribute information corresponding to the point cloud to be decoded are decoded separately. The geometric information is reconstructed after being decoded. The decoding of the attribute information depends on reconstructed geometric information.

Further, in the embodiment of the present disclosure, after the geometric information of the point cloud to be decoded is decoded, the decoder may determine Morton codes corresponding to all points in the point cloud to be decoded by use of information of the set of points in the point cloud to be decoded. After the Morton codes corresponding to all the points are obtained, the decoder may sequence all the Morton codes corresponding to all the points in the point cloud to be decoded from small to large Morton codes to generate a point cloud sequence set corresponding to the point cloud to be decoded. The point cloud sequence set stores all the Morton codes corresponding to all the points in the point cloud to be decoded.

It is to be noted that, in the embodiment of the present disclosure, the decoder, when decoding the attribute information of the point cloud to be decoded, may predict attribute information of all the points in the point cloud to be decoded sequentially from small to large Morton codes.

It can be understood that, in the embodiment of the present disclosure, the point to be predicted may be any point in the point cloud to be decoded. The current Morton code is a Morton code corresponding to the point to be predicted. When attribute information of the point to be predicted is being predicted, attribute information of another point corresponding to another Morton code smaller than the current Morton code has been predicted, and corresponding attribute reconstruction information has been generated.

Further, in the embodiment of the present disclosure, the decoder, when predicting the attribute information of the point to be predicted, needs to determine a Morton code corresponding to the point to be predicted first to obtain the current Morton code.

In S602, a target Morton code corresponding to the point to be predicted is determined based on the current Morton code according to a preset neighbor information table, the preset neighbor information table being used for determining a coordinate difference between a neighbor position of the point to be predicted and a preset reference point.

In the embodiment of the present disclosure, the decoder, after determining the current Morton code corresponding to the point to be predicted, may determine a target Morton code corresponding to the point to be predicted based on the current Morton code according to a preset neighbor information table. The target Morton code may represent a Morton code corresponding to a neighbor position around the point to be predicted.

It is to be noted that, in the embodiment of the present disclosure, the preset neighbor information table may represent a coordinate difference between a neighbor position around the point to be predicted and a preset reference point. The neighbor position of the point to be predicted may include a coplanar neighbor point coplanar with and neighboring to the point to be predicted, and may further include a collinear neighbor point collinear with and neighboring to the point to be predicted.

It can be understood that, in the embodiment of the present disclosure, when the attribute information of the point to be predicted is being predicted, if the point to be predicted is taken as a space center of the point cloud to be decoded, the preset reference point may be an origin of coordinates of a space centered about the point to be predicted. Specifically, based on the preset reference point, difference calculation may be performed on a distance between the preset reference point and the point to be predicted and a distance between the preset reference point and the neighbor position of the point to be predicted, thereby obtaining a coordinate difference between the neighbor position and the point to be predicted. The preset reference point may be a point corresponding to a minimum Morton code in the point cloud to be decoded.

Further, in the embodiment of the present disclosure, the decoder, before determining the target Morton code corresponding to the point to be predicted based on the current Morton code according to the preset neighbor information table, needs to establish the preset neighbor information table corresponding to the point to be predicted first. That is, the preset neighbor information table is established based on the point to be predicted.

It is to be noted that, in the embodiment of the present disclosure, the decoder, when establishing the preset neighbor information table corresponding to the point to be predicted, may operate the current Morton code (cur_pos) of the point to be predicted. Specifically, the decoder may be positioned to a Morton code (base_pos) corresponding to the preset reference point first. Then, a coordinate difference between the preset reference point and the neighbor position of the point to be predicted is calculated based on the Morton code of the preset reference point. Next, Morton coding continues to be performed on the coordinate difference. As such, the preset neighbor information table corresponding to the point to be predicted may be established.

That is, in the embodiment of the present disclosure, the neighbor position of the point to be predicted may include a coplanar neighbor point coplanar with and neighboring to the point to be predicted and a collinear neighbor point collinear with and neighboring to the point to be predicted. Therefore, the decoder, when establishing the preset neighbor information table corresponding to the point to be predicted, may calculate a first coordinate difference between the preset reference point and the coplanar neighbor point and a second coordinate difference between the preset reference point and the collinear neighbor point respectively. Then, Morton coding may be performed on the first coordinate difference to obtain a coplanar Morton code corresponding to the coplanar neighbor point. Meanwhile, Morton coding may be performed on the second coordinate difference to obtain a collinear Morton code corresponding to the collinear neighbor point. Finally, the decoder may establish the preset neighbor information table corresponding to the point to be predicted based on the coplanar Morton code and the collinear Morton code.

Further, in the embodiment of the present disclosure, the decoder, after determining the current Morton code of the point to be predicted in the point cloud to be decoded, may determine a target Morton code corresponding to the point to be predicted from a preset neighbor information table corresponding to the current Morton code. The target Morton code may represent a Morton code corresponding to a neighbor position around the point to be predicted.

Specifically, in the embodiment of the present disclosure, when the decoder determines the target Morton code corresponding to the point to be predicted based on the current Morton code and according to the preset neighbor information table, the preset neighbor information table stores a Morton code obtained by performing Morton decoding on a coordinate difference between the preset reference point and the neighbor position.

Therefore, the decoder may extract the Morton code of the coordinate difference corresponding to the neighbor position from the preset neighbor information table, and then further determine the target Morton code by use of the Morton code of the coordinate difference.

It can be understood that, in the embodiment of the present disclosure, the preset neighbor information table stores a coplanar Morton code and collinear Morton code corresponding to the point to be predicted. Therefore, the decoder, when determining the target Morton code, may extract the coplanar Morton code and/or the collinear Morton code from the preset neighbor information table, and then perform a summation operation on the current Morton code and at least one of the coplanar Morton code or the collinear Morton code to obtain the target Morton code.

It is to be noted that, in the embodiment of the present disclosure, the neighbor position of the point to be predicted includes the coplanar neighbor point and the collinear neighbor point. Therefore, the decoder, when determining the target Morton code, may determine a neighbor type first. The neighbor type may include coplanar neighbor and collinear neighbor. Then, the coplanar Morton code or the collinear Morton code are further extracted from the preset neighbor information table based on the determined neighbor type. The target Morton code is determined based on the coplanar Morton code or the collinear Morton code.

Exemplarily, in the present disclosure, for the point to be predicted, if a distance between the point to be predicted and the coplanar neighbor point is 1, a distance between the point to be predicted and the collinear neighbor point is $\sqrt{2}$. Based on the principle that the shorter the distance, the stronger the correlation, the neighbor type of coplanar neighbor may be preferred. Then, the coplanar Morton code is extracted from the preset neighbor information table so as to determine the target Morton code by use of the coplanar Morton code.

It is to be noted that, in the embodiment of the present disclosure, the target Morton code may represent the Morton code corresponding to the neighbor position around the point to be predicted. Therefore, the decoder may search for and determine a neighbor point around the point to be predicted by use of the target Morton code.

In S603, whether a neighbor point of the point to be predicted exists in the point cloud to be decoded is judged according to the target Morton code.

In the embodiment of the present disclosure, the decoder, after determining the target Morton code corresponding to the point to be predicted based on the current Morton code according to the preset neighbor information table, may judge whether a neighbor point of the point to be predicted exists in the point cloud to be decoded according to the target Morton code. That is, the decoder may further determine whether a point neighboring to the point to be predicted exists in the point cloud to be decoded by use of the Morton code corresponding to the neighbor position around the point to be predicted.

It is to be noted that, in the embodiment of the present disclosure, the decoder, after determining the target Morton code, may not determine the neighbor point of the point to be predicted directly according to the target Morton code. This is because the point cloud is not distributed uniformly in space, and the neighbor point may not really exist at the neighbor position of the point to be predicted. That is, there may not really be in the point cloud to be decoded a point corresponding to the target Morton code determined according to the neighbor position of the point to be predicted. Therefore, the decoder, after determining the target Morton code, further needs to judge whether the neighbor point of the point to be predicted exists in the point cloud to be decoded according to the target Morton code.

It can be understood that, in the embodiment of the present disclosure, the decoder, after obtaining Morton codes corresponding to all the points, may sequence all the Morton codes corresponding to all the points from small to large Morton codes to generate a point cloud sequence set corresponding to the point cloud to be decoded. Therefore, the decoder, after determining the target Morton code, may further judge whether the neighbor point of the point to be predicted exists by use of the point cloud sequence set corresponding to the point cloud to be decoded in conjunction with the target Morton code.

Further, in the embodiment of the present disclosure, the decoder, when judging whether the neighbor point of the point to be predicted exists in the point cloud to be decoded according to the point cloud sequence set and the target Morton code, may obtain the point cloud sequence set of the point cloud to be decoded first. Then, a query process may be performed in the point cloud sequence set based on the target Morton code to obtain a query result. If the query result is that the target Morton code exists in the point cloud sequence set, the decoder may determine that the neighbor point of the point to be predicted exists in the point cloud to be decoded. That is, in the present disclosure, the decoder, after determining the target Morton code, looks up the point cloud sequence set directly to judge whether the target Morton code exists. If YES, it may be determined that the neighbor point of the point to be predicted exists in the space. Correspondingly, if NO, it may be determined that the neighbor point of the point to be predicted does not exist in the space.

It is to be noted that, in the embodiment of the present disclosure, the decoder, when performing the query process in the point cloud sequence set based on the target Morton code, may traverse all Morton codes in the point cloud sequence set directly according to the target Morton code to obtain the query result, or perform the query process in the point cloud sequence set according to the target Morton code by using a preset query algorithm to obtain the query result.

That is, in the embodiment of the present disclosure, the decoder, when performing the query process in the point cloud sequence set based on the target Morton code, may traverse the point cloud sequence set, or use another algorithm to quickly look up the point cloud sequence set.

In S604, prediction is performed to obtain a predicted attribute value of the point to be predicted according to attribute reconstruction information of the neighbor point in response to that the neighbor point exists in the point cloud to be decoded.

In the embodiment of the present disclosure, the decoder, after judging whether the neighbor point of the point to be predicted exists in the point cloud to be decoded according to the target Morton code, may predict the attribute information of the point to be predicted directly according to attribute reconstruction information of the neighbor point of the point to be predicted to obtain a predicted attribute value in response to that the neighbor point of the point to be predicted exists in the point cloud to be decoded.

It is to be noted that, in the embodiment of the present disclosure, if the neighbor point of the point to be predicted exists, the decoder, when performing prediction to obtain the predicted attribute value of the point to be predicted according to the attribute reconstruction information of the neighbor point, may obtain a reconstructed attribute value of the neighbor point first. Then, average calculation is performed on the reconstructed attribute value to obtain an average corresponding to the reconstructed attribute value. As such, the average may be determined as the predicted attribute value.

It can be understood that, in the embodiment of the present disclosure, the neighbor point of the point to be predicted may be the coplanar neighbor point coplanar with and neighboring to the point to be predicted or the collinear neighbor point collinear with and neighboring to the point to be predicted. Therefore, if the decoder determines that the neighbor point of the point to be predicted is the coplanar neighbor point or the collinear neighbor point, the decoder, when obtaining the reconstructed attribute value of the neighbor point, may obtain a first reconstructed attribute value corresponding to the coplanar neighbor point or a second reconstructed attribute value corresponding to the collinear neighbor point.

Correspondingly, in the present disclosure, there is at least one coplanar neighbor point coplanar with and neighboring to the point to be predicted and at least one collinear neighbor point collinear with and neighboring to the point to be predicted. Therefore, the decoder, when performing average calculation on the reconstructed attribute value, may calculate a first average corresponding to at least one first reconstructed value or a second average corresponding to at least one second reconstructed value. Finally, the decoder may determine the first average or the second average as the predicted attribute value, thereby completing the prediction of the attribute information of the point to be predicted.

Further, in the embodiment of the present disclosure, if the decoder determines that the neighbor point of the point to be predicted is the coplanar neighbor point and the collinear neighbor point, the decoder, when obtaining the reconstructed attribute value of the neighbor point, may simultaneously obtain a first reconstructed attribute value corresponding to the coplanar neighbor point and a second reconstructed attribute value corresponding to the collinear neighbor point.

Correspondingly, in the present disclosure, there is at least one coplanar neighbor point coplanar with and neighboring to the point to be predicted and at least one collinear neighbor point collinear with and neighboring to the point to be predicted. Therefore, the decoder, when performing average calculation on the reconstructed attribute value, may perform weighted average calculation on the first reconstructed attribute value and the second reconstructed attribute value according to preset weights to obtain a weighted average. Finally, the decoder may determine the weighted average as the predicted attribute value, thereby completing the prediction of the attribute information of the point to be predicted.

It can be understood that, in the embodiment of the present disclosure, the decoder, when performing weighted average calculation on the first reconstructed attribute value and the second reconstructed attribute value according to the preset weights, may allocate different weight values to the first reconstructed attribute value and the second reconstructed attribute value respectively. Specifically, based on the principle that the shorter the distance, the stronger the correlation, the weight value corresponding to the first reconstructed attribute value is greater than the weight value corresponding to the second reconstructed attribute value.

Exemplarily, in the present disclosure, the point to be predicted has multiple neighbor points such as coplanar neighbor points and collinear neighbor points. For example, there are six neighbor points for the prediction of the attribute information of the point to be predicted, including three coplanar neighbor points and three collinear neighbor points. In such case, the decoder may perform distance-based weighted average calculation on reconstructed attribute values of all the neighbor points so as to implement the prediction of the attribute information of the point to be predicted to obtain the predicted attribute value of the point to be predicted. That is, a correlation between each neighbor point and the point to be predicted is weakened as a distance therebetween decreases. Therefore, a relatively high weight is allocated to a reconstructed attribute value of a neighbor point at a relatively short distance.

It can be understood that, in the embodiment of the present disclosure, the decoder, when predicting the attribute information of the point to be predicted, may determine the predicted attribute value of the point to be predicted based on both the first reconstructed attribute value of the coplanar neighbor point of the point to be predicted and the second reconstructed attribute value of the collinear neighbor point, or may select to determine the predicted attribute value of the point to be predicted based on the first reconstructed attribute value of the coplanar neighbor point of the point to be predicted or based on the second reconstructed attribute value of the collinear neighbor point. Based on the principle that the shorter the distance, the stronger the correlation, the coplanar neighbor point at a shorter distance may be preferred to predict the attribute information of the point to be predicted.

Exemplarily, in the present disclosure, the decoder may search for coplanar neighbor points at a distance of 1 first. If the coplanar neighbor points exist, an average of reconstructed attribute values of these coplanar neighbor points is determined as the predicted attribute value of the point to be predicted. If the coplanar neighbor points of the point to be predicted do not exist in the point cloud to be decoded, the decoder may search for collinear neighbor points at a distance of $\sqrt{2}$. Then, an average of reconstructed attribute values of these collinear neighbor points is determined as the predicted attribute value of the point to be predicted.

Figure 16:
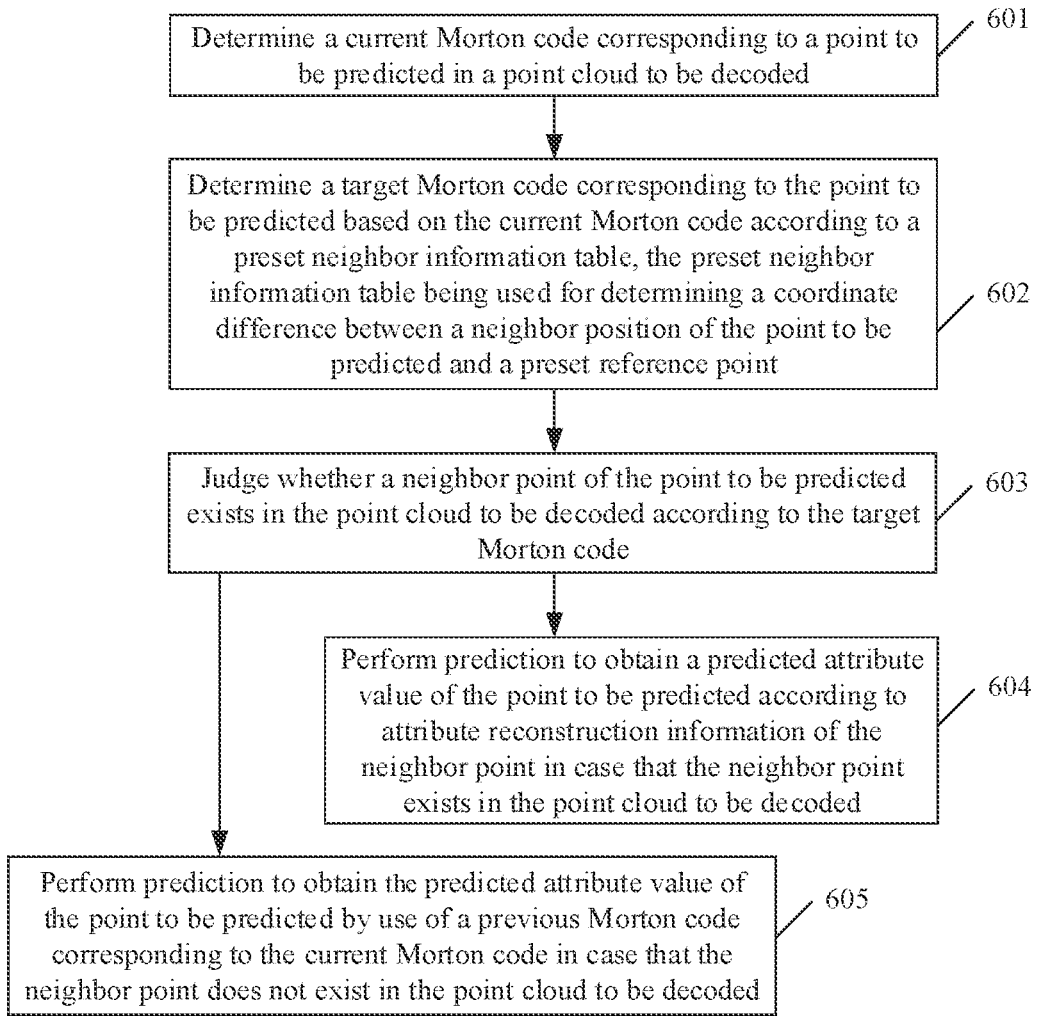
FIG. 16 is a seventh implementation flowchart of a method for predicting attribute information.

FIG. 16 is a seventh implementation flowchart of the method for predicting attribute information. As shown in FIG. 16, in the embodiment of the present disclosure, after the decoder judges whether the neighbor point exists in the point cloud to be decoded according to the target Morton code, namely after S603, the method that the decoder predicts attribute information of a point to be predicted may further include the following operation.

In S605, prediction is performed to obtain the predicted attribute value of the point to be predicted by use of a previous Morton code of the current Morton code in response to that the neighbor point does not exist in the point cloud to be decoded.

In the embodiment of the present disclosure, the decoder, after judging whether the neighbor point of the point to be predicted exists in the point cloud to be decoded according to the target Morton code, cannot predict the attribute information of the point to be predicted directly according to the neighbor point of the point to be predicted in response to that the neighbor point of the point to be predicted does not exist in the point cloud to be decoded. Therefore, the decoder needs to predict the attribute information of the point to be predicted by use of a previous Morton code of the current Morton code to obtain the predicted attribute value of the point to be predicted.

It is to be noted that, in the embodiment of the present disclosure, if the neighbor point does not exist for the point to be predicted, it means that there is no coplanar neighbor point or collinear neighbor point around the point to be predicted. In such case, the attribute information of the point to be predicted may be predicted only by use of a reconstructed attribute value corresponding to the previous Morton code of the current Morton code.

Further, in the embodiment of the present disclosure, the decoder, when performing prediction to obtain the predicted attribute value of the point to be predicted by use of the previous Morton code of the current Morton code, may determine a reconstructed point corresponding to the previous Morton code first from the point cloud to be decoded. Then, a reconstructed attribute value of the reconstructed point may be obtained. The reconstructed attribute value of the reconstructed point is determined as the predicted attribute value of the point to be predicted. That is, in the present disclosure, if it is determined based on the target Morton code that the neighbor point of the point to be predicted does not exist in the point cloud to be decoded, the reconstructed attribute value of the reconstructed point corresponding to the previous Morton code is determined directly as the predicted attribute value of the point to be predicted, thereby completing the prediction of the attribute information of the point to be predicted.

It can be understood that, in the embodiment of the present disclosure, if the neighbor point of the point to be predicted does not exist in the point cloud to be decoded, the decoder may search for the previous Morton code of the previous Morton code first from a point cloud sequence set of the point cloud to be decoded. The point cloud sequence set stores all Morton codes corresponding to all points in the point cloud to be decoded according to a sequence from small to large Morton codes.

Figure 17:
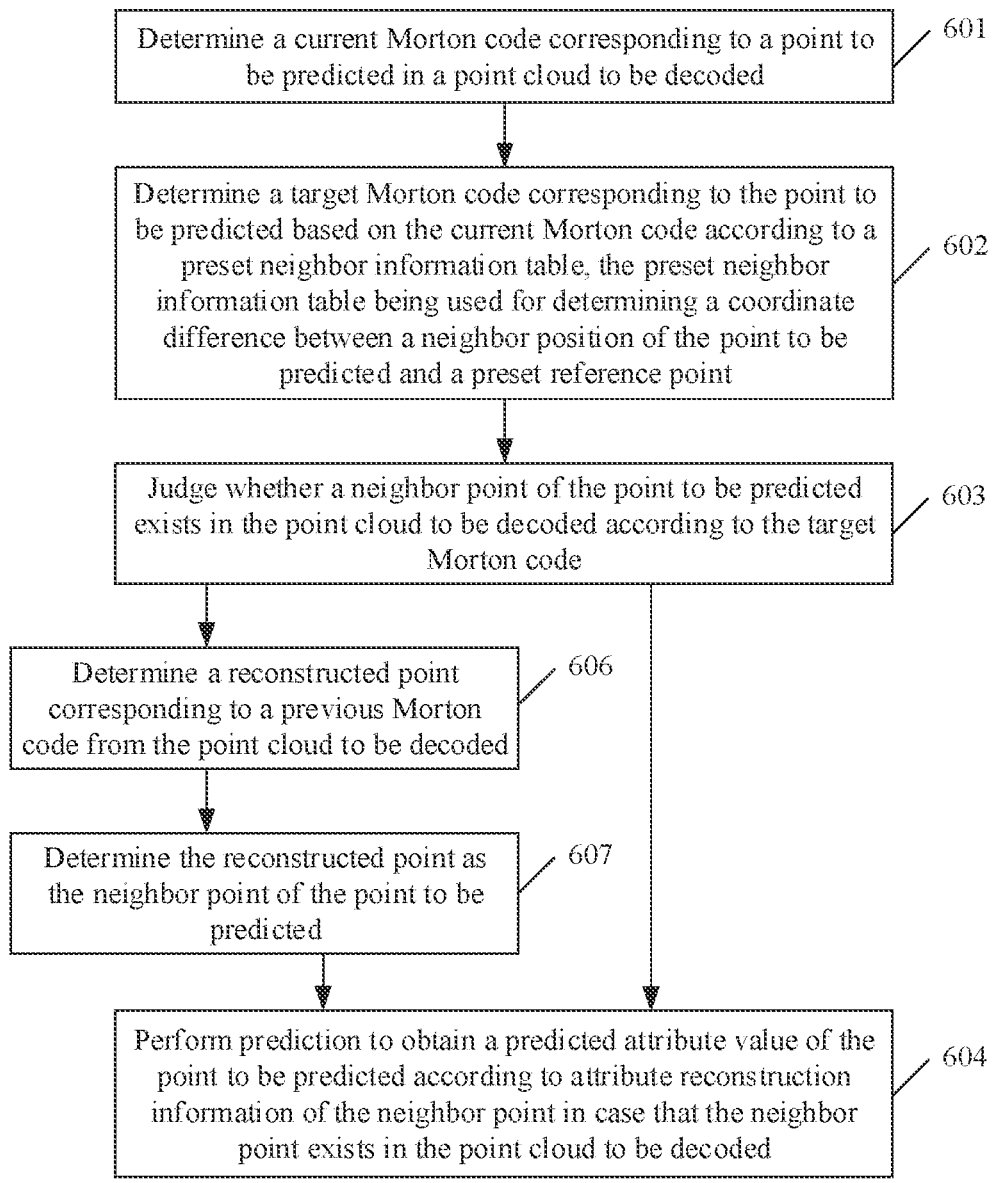
FIG. 17 is an eighth implementation flowchart of a method for predicting attribute information.

FIG. 17 is an eighth implementation flowchart of the method for predicting attribute information. As shown in FIG. 17, in the embodiment of the present disclosure, after the decoder judges whether the neighbor point exists in the point cloud to be decoded according to the target Morton code, namely after S603, and before prediction is performed to obtain the predicted attribute value of the point to be predicted according to the attribute reconstruction information of the neighbor point, namely before S604, the method that the decoder predicts attribute information of a point to be predicted may further include the following operations.

In S606, a reconstructed point corresponding to a previous Morton code is determined from the point cloud to be decoded.

In S607, the reconstructed point is determined as the neighbor point of the point to be predicted.

In the embodiment of the present disclosure, after the decoder judges whether the neighbor point of the point to be predicted exists in the point cloud to be decoded according to the target Morton code, if the neighbor point of the point to be predicted does not exist in the point cloud to be decoded, namely there is no coplanar neighbor point and collinear neighbor point around the point to be predicted, the decoder may determine a reconstructed point corresponding to a previous Morton code first from the point cloud to be decoded.

Further, in the embodiment of the present disclosure, the decoder, after determining the reconstructed point corresponding to the previous Morton code from the point cloud to be decoded, may determine the reconstructed point as the neighbor point of the point to be predicted. That is, in the present disclosure, if it is determined based on the target Morton code that the neighbor point of the point to be predicted does not exist in the point cloud to be decoded, the reconstructed point corresponding to the previous Morton code of the current Morton code is directly determined as the neighbor point of the point to be predicted. Then, the attribute information of the point to be predicted continues to be predicted according to the method in S604.

It can be understood that, in the embodiment of the present disclosure, after S603, namely after the decoder judges whether the neighbor point exists in the point cloud to be decoded according to the target Morton code, if the neighbor point of the point to be predicted exists in the point cloud to be decoded, the decoder may perform prediction directly to obtain the predicted attribute value of the point to be predicted according to the attribute reconstruction information of the neighbor point. If the neighbor point of the point to be predicted does not exist in the point cloud to be decoded, the decoder may search for the previous Morton code of the current Morton code first from the point cloud sequence set of the point cloud to be decoded. Then, the reconstructed point corresponding to the previous Morton code is determined from the point cloud to be decoded. The reconstructed point is determined as the neighbor point of the point to be predicted. As such, prediction may continue to be performed to obtain the predicted attribute value of the point to be predicted according to the attribute reconstruction information of the neighbor point.

Thus it can be seen that, in the embodiment of the present disclosure, if it is determined based on the target Morton code that the neighbor point of the point to be predicted does not exist in the point cloud to be decoded, the decoder may determine a reconstructed point corresponding to the previous Morton code of the current Morton code in the point cloud sequence set as the neighbor point of the point to be predicted, and then perform prediction to obtain the predicted attribute value of the point to be predicted according to the attribute reconstruction information of the neighbor point.

It is to be noted that, in the embodiment of the present disclosure, based on the method including S601 to S607, the decoder, when predicting attribute information of a point to be predicted, may determine a target Morton code corresponding to a neighbor position around the point to be predicted by use of a current Morton code corresponding to the point to be predicted based on a preset neighbor information table. If a neighbor point of the point to be predicted exists at the neighbor position in a point cloud, the coder/decoder may perform prediction to obtain a predicted attribute value of the point to be predicted directly by use of a reconstructed attribute value of the neighbor point. Since the point to be predicted is correlated with the neighbor point more strongly, predicting the attribute information of the point to be predicted by use of the neighbor point may improve the prediction accuracy effectively.

Further, in the embodiment of the present disclosure, if the point cloud to be decoded is layered, the decoder may use the method including S601 to S607 for intra-layer prediction of the point cloud to be decoded.

Further, in the embodiment of the present disclosure, according to the method for predicting attribute information disclosed in the present disclosure, the spatial correlation of the point cloud may be utilized fully, so that the prediction residual is smaller and more applicable to subsequent quantization and entropy decoding, and a higher gain may be achieved on the premise of keeping the PSNR.

The embodiment of the present disclosure provides a method for predicting attribute information. The decoder determines a current Morton code corresponding to a point to be predicted in a point cloud to be decoded, determines a target Morton code corresponding to the point to be predicted based on the current Morton code according to a preset neighbor information table, the preset neighbor information table being used for determining a coordinate difference between a neighbor position of the point to be predicted and a preset reference point. The decoder judges whether a neighbor point of the point to be predicted exists in the point cloud to be decoded according to the target Morton code, and performs prediction to obtain a predicted attribute value of the point to be predicted according to attribute reconstruction information of the neighbor point in response to that the neighbor point exists in the point cloud to be decoded. Thus, it can be seen that, in the embodiment of the present disclosure, the coder/decoder, when predicting attribute information of a point to be predicted, may determine a target Morton code corresponding to a neighbor position around the point to be predicted by use of a current Morton code corresponding to the point to be predicted based on a preset neighbor information table. If a neighbor point of the point to be predicted exists at the neighbor position in a point cloud, the coder/decoder may perform prediction to obtain a predicted attribute value of the point to be predicted directly by use of a reconstructed attribute value of the neighbor point. Since the point to be predicted is correlated with the neighbor point more strongly, predicting the attribute information of the point to be predicted by use of the neighbor point can improve the prediction accuracy effectively and reduce a prediction residual greatly. Therefore, the coding efficiency is improved.

Figure 18:
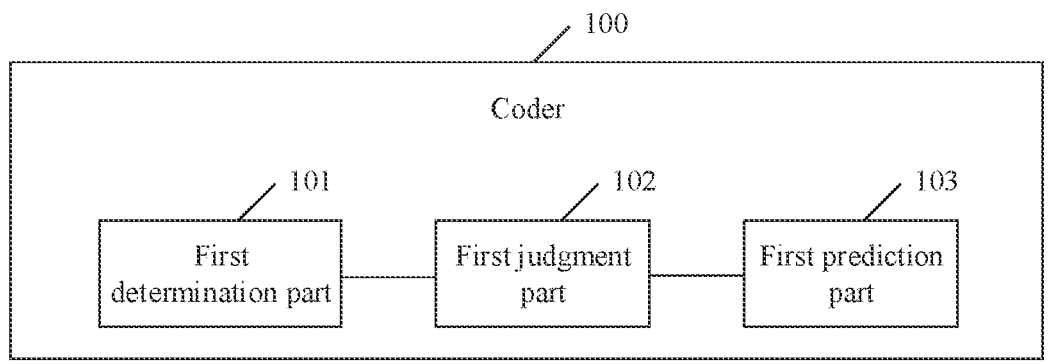
FIG. 18 is a first composition structure diagram of a coder.

Based on the above-mentioned embodiments, another embodiment of the present disclosure discloses a coder. FIG. 18 is a first composition structure diagram of a coder. As shown in FIG. 18, the coder 100 disclosed in the embodiment of the present disclosure may include a first determination part 101, a first judgment part 102, and a first prediction part 103.

The first determination part 101 is configured to determine a current Morton code corresponding to a point to be predicted in a point cloud to be coded, and determine a target Morton code corresponding to the point to be predicted based on the current Morton code according to a preset neighbor information table, the preset neighbor information table being used for determining a coordinate difference between a neighbor position of the point to be predicted and a preset reference point.

The first judgment part 102 is configured to judge whether a neighbor point of the point to be predicted exists in the point cloud to be coded according to the target Morton code.

The first prediction part 103 is configured to perform prediction to obtain a predicted attribute value of the point to be predicted according to attribute reconstruction information of the neighbor point in response to that the neighbor point exists in the point cloud to be coded.

Figure 19:
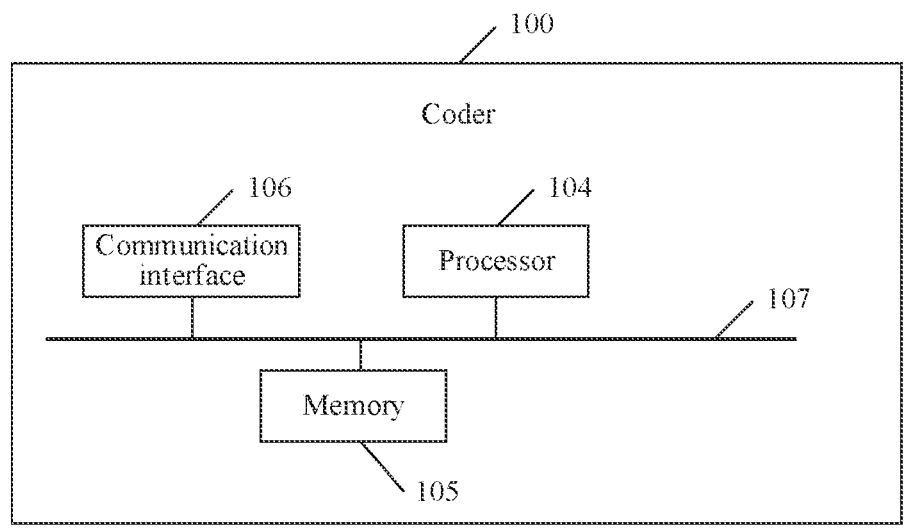
FIG. 19 is a second composition structure diagram of a coder.

FIG. 19 is a second composition structure diagram of a coder. As shown in FIG. 19, the coder 100 disclosed in the embodiment of the present disclosure may further include a first processor 104, a first memory 105 storing instructions executable by the first processor 104, a first communication interface 106, and a first bus 107 configured to connect the first processor 104, the first memory 105, and the first communication interface 106.

Further, in the embodiment of the present disclosure, the first processor 104 is configured to determine a current Morton code corresponding to a point to be predicted in a point cloud to be coded, determine a target Morton code corresponding to the point to be predicted based on the current Morton code according to a preset neighbor information table, the preset neighbor information table being used for determining a coordinate difference between a neighbor position of the point to be predicted and a preset reference point, judge whether a neighbor point of the point to be predicted exists in the point cloud to be coded according to the target Morton code, and perform prediction to obtain a predicted attribute value of the point to be predicted according to attribute reconstruction information of the neighbor point in response to that the neighbor point exists in the point cloud to be coded.

In addition, each function module in the embodiment may be integrated into a processing unit. Alternatively, each unit may physically exist independently. Alternatively, two or more than two units may be integrated into a unit. The integrated unit may be implemented in a hardware form, or in form of a software function module.

When being implemented in form of a software function module and sold or used not as an independent product, the integrated unit may be stored in a computer-readable storage medium. Based on such an understanding, the technical solution of the embodiment substantially or parts making contributions to the conventional art or all or part of the technical solution may be embodied in form of a software product. The computer software product is stored in a storage medium, including a plurality of instructions for enabling a computer device (which may be a personal computer, a server, a network device, or the like) or a processor to execute all or part of the steps of the method in the embodiment. The storage medium includes various media capable of storing program codes, such as a U disk, a mobile hard disk, a Read Only Memory (ROM), a Random Access Memory (RAM), a magnetic disk, or an optical disk.

The embodiment of the present disclosure provides a coder. The coder determines a current Morton code corresponding to a point to be predicted in a point cloud to be coded, determines a target Morton code corresponding to the point to be predicted based on the current Morton code according to a preset neighbor information table, the preset neighbor information table being used for determining a coordinate difference between a neighbor position of the point to be predicted and a preset reference point. The coder judges whether a neighbor point of the point to be predicted exists in the point cloud to be coded according to the target Morton code, and performs prediction to obtain a predicted attribute value of the point to be predicted according to attribute reconstruction information of the neighbor point in response to that the neighbor point exists in the point cloud to be coded. Thus, it can be seen that, in the embodiment of the present disclosure, the coder/decoder, when predicting attribute information of a point to be predicted, may determine a target Morton code corresponding to a neighbor position around the point to be predicted by use of a current Morton code corresponding to the point to be predicted based on a preset neighbor information table. If a neighbor point of the point to be predicted exists at the neighbor position in a point cloud, the coder/decoder may perform prediction to obtain a predicted attribute value of the point to be predicted directly by use of a reconstructed attribute value of the neighbor point. Since the point to be predicted is correlated with the neighbor point more strongly, predicting the attribute information of the point to be predicted by use of the neighbor point may improve the prediction accuracy effectively and reduces a prediction residual greatly. Therefore, the coding efficiency is improved.

Figure 20:
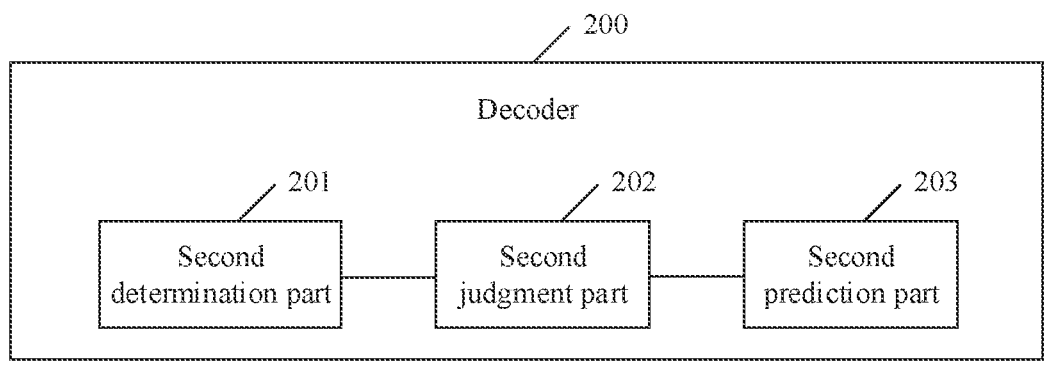
FIG. 20 is a first composition structure diagram of a decoder.

Based on the above-mentioned embodiments, in another embodiment of the present disclosure, FIG. 20 is a first composition structure diagram of a decoder. As shown in FIG. 20, the decoder 200 disclosed in the embodiment of the present disclosure may include a second determination part 201, a second judgment part 202, and a second prediction part 203.

The second determination part 201 is configured to determine a current Morton code corresponding to a point to be predicted in a point cloud to be decoded, and determine a target Morton code corresponding to the point to be predicted based on the current Morton code according to a preset neighbor information table, the preset neighbor information table being used for determining a coordinate difference between a neighbor position of the point to be predicted and a preset reference point.

The second judgment part 202 is configured to judge whether a neighbor point of the point to be predicted exists in the point cloud to be decoded according to the target Morton code.

The second prediction part 203 is configured to perform prediction to obtain a predicted attribute value of the point to be predicted according to attribute reconstruction information of the neighbor point in response to that the neighbor point exists in the point cloud to be decoded.

Figure 21:
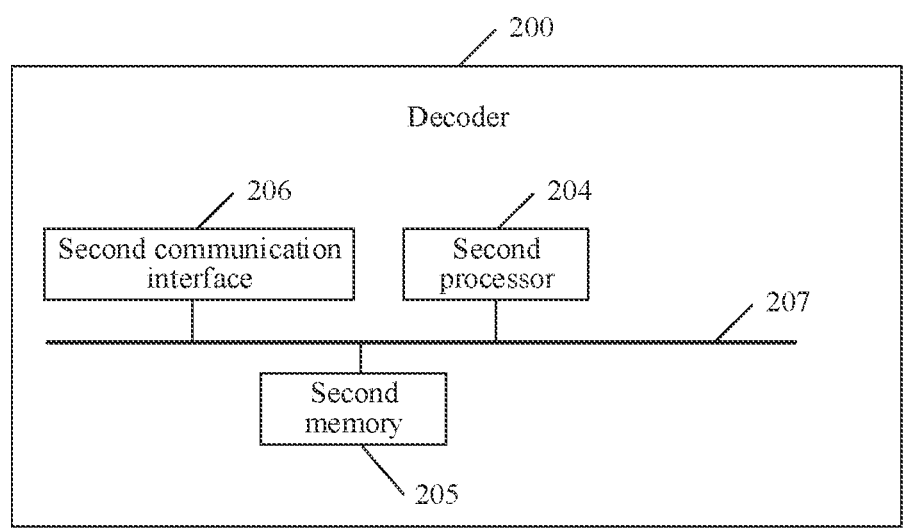
FIG. 21 is a second composition structure diagram of a decoder.

FIG. 21 is a second composition structure diagram of a decoder. As shown in FIG. 21, the decoder 200 disclosed in the embodiment of the present disclosure may further include a second processor 204, a second memory 205 storing instructions executable by the second processor 204, a second communication interface 206, and a second bus 207 configured to connect the second processor 204, the second memory 205, and the second communication interface 206.

Further, in the embodiment of the present disclosure, the second processor 204 is configured to determine a current Morton code corresponding to a point to be predicted in a point cloud to be decoded, determine a target Morton code corresponding to the point to be predicted based on the current Morton code according to a preset neighbor information table, the preset neighbor information table being used for determining a coordinate difference between a neighbor position of the point to be predicted and a preset reference point, judge whether a neighbor point of the point to be predicted exists in the point cloud to be decoded according to the target Morton code, and perform prediction to obtain a predicted attribute value of the point to be predicted according to attribute reconstruction information of the neighbor point in response to that the neighbor point exists in the point cloud to be decoded.

In addition, each function module in the embodiment may be integrated into a processing unit. Alternatively, each unit may physically exist independently. Alternatively, two or more than two units may be integrated into a unit. The integrated unit may be implemented in a hardware form, or in form of a software function module.

When being implemented in form of a software function module and sold or used not as an independent product, the integrated unit may be stored in a computer-readable storage medium. Based on such an understanding, the technical solution of the embodiment substantially or parts making contributions to the conventional art or all or part of the technical solution may be embodied in form of a software product. The computer software product is stored in a storage medium, including a plurality of instructions for enabling a computer device (which may be a personal computer, a server, a network device, or the like) or a processor to execute all or part of the steps of the method in the embodiment. The above-mentioned storage medium includes various media capable of storing program codes, such as a U disk, a mobile hard disk, a ROM, a RAM, a magnetic disk, or an optical disk.

The embodiment of the present disclosure provides a decoder. The decoder determines a current Morton code corresponding to a point to be predicted in a point cloud to be decoded, determines a target Morton code corresponding to the point to be predicted based on the current Morton code according to a preset neighbor information table, the preset neighbor information table being used for determining a coordinate difference between a neighbor position of the point to be predicted and a preset reference point. The decoder judges whether a neighbor point of the point to be predicted exists in the point cloud to be decoded according to the target Morton code, and performs prediction to obtain a predicted attribute value of the point to be predicted according to attribute reconstruction information of the neighbor point in response to that the neighbor point exists in the point cloud to be decoded. Thus, it can be seen that, in the embodiment of the present disclosure, the coder/decoder, when predicting attribute information of a point to be predicted, may determine a target Morton code corresponding to a neighbor position around the point to be predicted by use of a current Morton code corresponding to the point to be predicted based on a preset neighbor information table. If a neighbor point of the point to be predicted exists at the neighbor position in a point cloud, the coder/decoder may perform prediction to obtain a predicted attribute value of the point to be predicted directly by use of a reconstructed attribute value of the neighbor point. Since the point to be predicted is correlated with the neighbor point more strongly, predicting the attribute information of the point to be predicted by use of the neighbor point may improve the prediction accuracy effectively and reduces a prediction residual greatly. Therefore, the coding efficiency is improved.

An embodiment of the present disclosure provides a computer-readable storage medium, which stores a program. The program is executed by a processor to implement the methods as described in the above-mentioned embodiments.

Specifically, a program instruction corresponding to a method for predicting attribute information in this embodiment may be stored in a storage medium, such as an optical disk, a hard disk, or a U disk. When the program instruction corresponding to the method for predicting attribute information in the storage medium is read or executed by an electronic device, the following operations are included:

determining a current Morton code corresponding to a point to be predicted in a point cloud to be coded;

determining a target Morton code corresponding to the point to be predicted based on the current Morton code according to a preset neighbor information table, the preset neighbor information table being used for determining a coordinate difference between a neighbor position of the point to be predicted and a preset reference point;

judging whether a neighbor point of the point to be predicted exists in the point cloud to be coded according to the target Morton code; and performing prediction to obtain a predicted attribute value of the point to be predicted according to attribute reconstruction information of the neighbor point in response to that the neighbor point exists in the point cloud to be coded.

When the program instruction corresponding to the method for predicting attribute information in the storage medium is read or executed by the electronic device, the following operations are further included:

determining a current Morton code corresponding to a point to be predicted in a point cloud to be decoded;

determining a target Morton code corresponding to the point to be predicted based on the current Morton code and according to a preset neighbor information table, the preset neighbor information table being used for determining a coordinate difference between a neighbor position of the point to be predicted and a preset reference point;

judging whether a neighbor point of the point to be predicted exists in the point cloud to be decoded according to the target Morton code; and performing prediction to obtain a predicted attribute value of the point to be predicted according to attribute reconstruction information of the neighbor point in response to that the neighbor point exists in the point cloud to be decoded.

The embodiments of the present disclosure provide a method for predicting attribute information, a coder, a decoder, and a storage medium, which may improve the prediction accuracy effectively and reduce a prediction residual greatly, thereby improving the coding efficiency.

The technical solutions of the embodiments of the present disclosure may be implemented as follows.

According to a first aspect, an embodiment of the present disclosure provides a method for predicting attribute information, which may be applied to a coder and include the following operations.

A current Morton code corresponding to a point to be predicted in a point cloud to be coded is determined.

A target Morton code corresponding to the point to be predicted is determined based on the current Morton code and according to a preset neighbor information table, the preset neighbor information table being used for determining a coordinate difference between a neighbor position of the point to be predicted and a preset reference point.

Whether a neighbor point of the point to be predicted exists in the point cloud to be coded is judged according to the target Morton code.

Prediction is performed to obtain a predicted attribute value of the point to be predicted according to attribute reconstruction information of the neighbor point in response to that the neighbor point exists in the point cloud to be coded.

According to a second aspect, an embodiment of the present disclosure also provides a method for predicting attribute information, which may be applied to a decoder and include the following operations.

A current Morton code corresponding to a point to be predicted in a point cloud to be decoded is determined A target Morton code corresponding to the point to be predicted is determined based on the current Morton code and according to a preset neighbor information table, the preset neighbor information table being used for determining a coordinate difference between a neighbor position of the point to be predicted and a preset reference point.

Whether a neighbor point of the point to be predicted exists in the point cloud to be decoded according to the target Morton code is judged.

Prediction is performed to obtain a predicted attribute value of the point to be predicted according to attribute reconstruction information of the neighbor point in response to that the neighbor point exists in the point cloud to be decoded.

According to a third aspect, an embodiment of the present disclosure also provides a coder, which may include a first determination part, a first judgment part, and a first prediction part.

The first determination part may be configured to determine a current Morton code corresponding to a point to be predicted in a point cloud to be coded, and determine a target Morton code corresponding to the point to be predicted based on the current Morton code and according to a preset neighbor information table, the preset neighbor information table being used for determining a coordinate difference between a neighbor position of the point to be predicted and a preset reference point.

The first judgment part may be configured to judge whether a neighbor point of the point to be predicted exists in the point cloud to be coded according to the target Morton code.

The first prediction part may be configured to perform prediction to obtain a predicted attribute value of the point to be predicted according to attribute reconstruction information of the neighbor point in response to that the neighbor point exists in the point cloud to be coded.

According to a fourth aspect, an embodiment of the present disclosure also provides a decoder, which may include a second determination part, a second judgment part, and a second prediction part.

The second determination part may be configured to determine a current Morton code corresponding to a point to be predicted in a point cloud to be decoded, and determine a target Morton code corresponding to the point to be predicted based on the current Morton code and according to a preset neighbor information table, the preset neighbor information table being used for determining a coordinate difference between a neighbor position of the point to be predicted and a preset reference point.

The second judgment part may be configured to judge whether a neighbor point of the point to be predicted exists in the point cloud to be decoded according to the target Morton code.

The second prediction part may be configured to perform prediction to obtain a predicted attribute value of the point to be predicted according to attribute reconstruction information of the neighbor point in response to that the neighbor point exists in the point cloud to be decoded.

According to a fifth aspect, an embodiment of the present disclosure also provides a coder, which may include a first processor and a first memory storing instructions executable by the first processor. The instruction may be executed by the first processor to implement the method for predicting attribute information as described above.

According to a sixth aspect, an embodiment of the present disclosure also provides a decoder, which may include a second processor and a second memory storing instructions executable by the second processor. The instruction may be executed by the second processor to implement the method for predicting attribute information as described above.

According to a seventh aspect, an embodiment of the present disclosure also provides a computer-readable storage medium, which may store a program applied to a coder. The program may be executed by a processor to implement the method for predicting attribute information as described above.

According to an eighth aspect, an embodiment of the present disclosure also provides a computer-readable storage medium, which may store a program applied to a decoder. The program may be executed by a processor to implement the method for predicting attribute information as described above.

The embodiments of the present disclosure provide a method for predicting attribute information, a coder, a decoder, and a storage medium. The coder determines a current Morton code corresponding to a point to be predicted in a point cloud to be coded, determines a target Morton code corresponding to the point to be predicted based on the current Morton code according to a preset neighbor information table, the preset neighbor information table being used for determining a coordinate difference between a neighbor position of the point to be predicted and a preset reference point, judges whether a neighbor point of the point to be predicted exists in the point cloud to be coded according to the target Morton code, and performs prediction to obtain a predicted attribute value of the point to be predicted according to attribute reconstruction information of the neighbor point in response to that the neighbor point exists in the point cloud to be coded. The decoder determines a current Morton code corresponding to a point to be predicted in a point cloud to be decoded, determines a target Morton code corresponding to the point to be predicted based on the current Morton code according to a preset neighbor information table, judges whether a neighbor point of the point to be predicted exists in the point cloud to be decoded according to the target Morton code, and performs prediction to obtain a predicted attribute value of the point to be predicted according to attribute reconstruction information of the neighbor point in response to that the neighbor point exists in the point cloud to be decoded. Thus, it can be seen that, in the embodiments of the present disclosure, the coder/decoder, when predicting attribute information of a point to be predicted, may determine a target Morton code corresponding to a neighbor position around the point to be predicted by use of a current Morton code corresponding to the point to be predicted based on a preset neighbor information table. If a neighbor point of the point to be predicted exists at the neighbor position in a point cloud, the coder/decoder may perform prediction to obtain a predicted attribute value of the point to be predicted directly by use of a reconstructed attribute value of the neighbor point. Since the point to be predicted is closely correlated with the neighbor point, predicting the attribute information of the point to be predicted by use of the neighbor point may improve the prediction accuracy effectively and reduces a prediction residual greatly. Therefore, the coding efficiency is improved.

Those skilled in the art should know that the embodiment of the present disclosure may be provided as a method, a system, or a computer program product. Therefore, a form of a hardware embodiment, a software embodiment, or an embodiment combining software and hardware may be used in the present disclosure. Moreover, a form of a computer program product implemented on one or more computer-available storage media (including, but not limited to, a disk memory, an optical memory, etc.) including computer-available program codes may be used in the present disclosure.

The present disclosure is described with reference to implementation flowcharts and/or block diagrams of the method, device (system), and computer program product according to the embodiments of the present disclosure. It is to be understood that each flow and/or block in the flowcharts and/or the block diagrams and combinations of the flows and/or blocks in the implementation flowcharts and/or the block diagrams may be implemented by computer program instructions. These computer program instructions may be provided for a general-purpose computer, a special-purpose computer, an embedded processor, or a processor of another programmable data processing device to generate a machine, so that a device for realizing a function specified in one flow or multiple flows in the implementation flowcharts and/or one block or multiple blocks in the block diagrams is generated by the instructions executed through the computer or the processor of the other programmable data processing device.

Alternatively, these computer program instructions may be stored in a computer-readable memory capable of guiding the computer or the other programmable data processing device to work in a specific manner, so that a product including an instruction device may be generated by the instructions stored in the computer-readable memory, the instruction device realizing the function specified in one flow or multiple flows in the implementation flowcharts and/or one block or multiple blocks in the block diagrams.

Alternatively, these computer program instructions may be loaded onto the computer or the other programmable data processing device, so that a series of operating steps are executed on the computer or the other programmable data processing device to generate processing implemented by the computer, and steps for realizing the function specified in one flow or multiple flows in the implementation flowcharts and/or one block or multiple blocks in the block diagrams are provided by the instructions executed on the computer or the other programmable data processing device.

The above is only the preferred embodiment of the present disclosure and not intended to limit the scope of protection of the present disclosure.

The embodiments of the present disclosure provide a method for predicting attribute information, a coder, a decoder, and a storage medium. The coder determines a current Morton code corresponding to a point to be predicted in a point cloud to be coded, determines a target Morton code corresponding to the point to be predicted based on the current Morton code according to a preset neighbor information table, the preset neighbor information table being used for determining a coordinate difference between a neighbor position of the point to be predicted and a preset reference point, judges whether a neighbor point of the point to be predicted exists in the point cloud to be coded according to the target Morton code, and performs prediction to obtain a predicted attribute value of the point to be predicted according to attribute reconstruction information of the neighbor point in response to that the neighbor point exists in the point cloud to be coded. The decoder determines a current Morton code corresponding to a point to be predicted in a point cloud to be decoded, determines a target Morton code corresponding to the point to be predicted based on the current Morton code according to a preset neighbor information table, judges whether a neighbor point of the point to be predicted exists in the point cloud to be decoded according to the target Morton code, and performs prediction to obtain a predicted attribute value of the point to be predicted according to attribute reconstruction information of the neighbor point in response to that the neighbor point exists in the point cloud to be decoded. Thus, it can be seen that, in the embodiment of the present disclosure, the coder/decoder, when predicting attribute information of a point to be predicted, may determine a target Morton code corresponding to a neighbor position around the point to be predicted by use of a current Morton code corresponding to the point to be predicted based on a preset neighbor information table. If a neighbor point of the point to be predicted exists at the neighbor position in a point cloud, the coder/decoder may perform prediction to obtain a predicted attribute value of the point to be predicted directly by use of a reconstructed attribute value of the neighbor point. Since the point to be predicted is correlated with the neighbor point more strongly, predicting the attribute information of the point to be predicted by use of the neighbor point can improve the prediction accuracy effectively and reduce a prediction residual greatly. Therefore, the coding efficiency is improved.

The invention claimed is:

1. A method for predicting attribute information, applied to a coder, the method comprising:
   determining position information corresponding to a current point in a point cloud;
   determining target position information corresponding to the current point based on the position information according to a preset neighbor information table, the preset neighbor information table being used for determining a coordinate difference between a neighbor position of the current point and a preset reference point, wherein the neighbor position comprises a coplanar neighbor point coplanar with and neighboring to the current point and a collinear neighbor point collinear with and neighboring to the current point, and wherein the preset neighbor information table is created based on coordinate differences calculated based on the coplanar neighbor point and the collinear neighbor point;
   judging whether a neighbor point of the current point exists in the point cloud according to the target position information; and
   performing prediction to obtain a predicted attribute value of the current point according to attribute reconstruction information of the neighbor point in response to that the neighbor point exists in the point cloud.

2. The method of claim 1, before the determining the target position information corresponding to the current point based on the position information according to a preset neighbor information table, further comprising:
   establishing the preset neighbor information table corresponding to the current point.

3. The method of claim 2, wherein the establishing the preset neighbor information table corresponding to the current point comprises:
   positioning the preset reference point;
   calculating a first coordinate difference between the preset reference point and the coplanar neighbor point, and calculating a second coordinate difference between the preset reference point and the collinear neighbor point;
   performing coding on the first coordinate difference to obtain coplanar position information corresponding to the coplanar neighbor point, and performing coding on the second coordinate difference to obtain collinear position information corresponding to the collinear neighbor point; and
   establishing the preset neighbor information table corresponding to the current point based on the coplanar position information and the collinear position information.

4. The method of claim 1, wherein the judging whether a neighbor point of the current point exists in the point cloud according to the target position information comprises:
   obtaining a point cloud sequence set of the point cloud;
   performing a query process in the point cloud sequence set based on the target position information to obtain a query result; and
   determining that the neighbor point exists in response to that the query result is that the target position information exists in the point cloud sequence set.

5. The method of claim 4, wherein the performing a query process in the point cloud sequence set based on the target position information to obtain a query result comprises:
   traversing the point cloud sequence set based on the target position information to obtain the query result.

6. A method for predicting attribute information, applied to a decoder and comprising:
   determining position information corresponding to a current point in a point cloud;
   determining target position information corresponding to the current point based on the position information according to a preset neighbor information table, the preset neighbor information table being used for determining a coordinate difference between a neighbor position of the current point and a preset reference point, wherein the neighbor position comprises a coplanar neighbor point coplanar with and neighboring to the current point and a collinear neighbor point collinear with and neighboring to the current point, and wherein the preset neighbor information table is created based on coordinate differences calculated based on the coplanar neighbor point and the collinear neighbor point;
   judging whether a neighbor point of the current point exists in the point cloud according to the target position information; and
   performing prediction to obtain a predicted attribute value of the current point according to attribute reconstruction information of the neighbor point in response to that the neighbor point exists in the point cloud.

7. The method of claim 6, before the determining target position information corresponding to the current point based on the current position information according to a preset neighbor information table, further comprising:
   establishing the preset neighbor information table corresponding to the current point.

8. The method of claim 7, wherein the establishing the preset neighbor information table corresponding to the current point comprises:
   positioning the preset reference point;
   calculating a first coordinate difference between the preset reference point and the coplanar neighbor point, and calculating a second coordinate difference between the preset reference point and the collinear neighbor point;
   performing coding on the first coordinate difference to obtain coplanar position information corresponding to the coplanar neighbor point, and performing coding on the second coordinate difference to obtain collinear position information corresponding to the collinear neighbor point; and establishing the preset neighbor information table corresponding to the current point based on the coplanar position information and the collinear position information.

9. The method of claim 6, wherein the judging whether a neighbor point of the current point exists in the point cloud according to the target position information comprises:
obtaining a point cloud sequence set of the point cloud;
performing a query process in the point cloud sequence set based on the target position information to obtain a query result; and
determining that the neighbor point exists in response to that the query result is that the target position information exists in the point cloud sequence set.

10. The method of claim 9, wherein the performing a query process in the point cloud sequence set based on the target position information to obtain a query result comprises:
traversing the point cloud sequence set based on the target position information to obtain the query result.

11. A coder, comprising a first processor and a first memory storing instructions executable by the first processor, wherein the first processor is configured to:
determine position information corresponding to a current point in a point cloud, and determine target position information corresponding to the current point based on the position information according to a preset neighbor information table, the preset neighbor information table being used for determining a coordinate difference between a neighbor position of the current point and a preset reference point, wherein the neighbor position comprises a coplanar neighbor point coplanar with and neighboring to the current point and a collinear neighbor point collinear with and neighboring to the current point, and wherein the preset neighbor information table is created based on coordinate differences calculated based on the coplanar neighbor point and the collinear neighbor point;
judge whether a neighbor point of the current point exists in the point cloud according to the target position information; and
perform prediction to obtain a predicted attribute value of the current point according to attribute reconstruction information of the neighbor point in response to that the neighbor point exists in the point cloud.

12. The coder of claim 11, wherein before determining the target position information corresponding to the current point based on the position information according to a preset neighbor information table, the first processor is further configured to:
establish the preset neighbor information table corresponding to the current point.

13. The coder of claim 12, wherein
in order to establish the preset neighbor information table corresponding to the current point, the first processor is configured to:
position the preset reference point;
calculate a first coordinate difference between the preset reference point and the coplanar neighbor point, and calculate a second coordinate difference between the preset reference point and the collinear neighbor point;
perform coding on the first coordinate difference to obtain coplanar position information corresponding to the coplanar neighbor point, and perform coding on the second coordinate difference to obtain collinear position information corresponding to the collinear neighbor point; and
establish the preset neighbor information table corresponding to the current point based on the coplanar position information and the collinear position information.

14. The coder of claim 11, wherein in order to judge whether a neighbor point of the current point exists in the point cloud according to the target position information, the first processor is configured to:
obtain a point cloud sequence set of the point cloud;
perform a query process in the point cloud sequence set based on the target position information to obtain a query result; and
determine that the neighbor point exists in response to that the query result is that the target position information exists in the point cloud sequence set.

15. The coder of claim 14, wherein in order to perform the query process in the point cloud sequence set based on the target position information to obtain the query result, the first processor is configured to:
traverse the point cloud sequence set based on the target position information to obtain the query result.

16. A decoder, comprising a second processor and a second memory storing instructions executable by the second processor, wherein the second processor is configured to:
determine position information corresponding to a current point in a point cloud, and determine target position information corresponding to the current point based on the position information according to a preset neighbor information table, the preset neighbor information table being used for determining a coordinate difference between a neighbor position of the current point and a preset reference point, wherein the neighbor position comprises a coplanar neighbor point coplanar with and neighboring to the current point and a collinear neighbor point collinear with and neighboring to the current point, and wherein the preset neighbor information table is created based on coordinate differences calculated based on the coplanar neighbor point and the collinear neighbor point;
judge whether a neighbor point of the current point exists in the point cloud according to the target position information; and
perform prediction to obtain a predicted attribute value of the current point according to attribute reconstruction information of the neighbor point in response to that the neighbor point exists in the point cloud.

17. The decoder of claim 16, wherein before determining target position information corresponding to the current point based on the current position information according to the preset neighbor information table, the second processor is further configured to:
establish the preset neighbor information table corresponding to the current point.

18. The decoder of claim 17, wherein
in order to establish the preset neighbor information table corresponding to the current point, the second processor is configured to:
position the preset reference point;
calculate a first coordinate difference between the preset reference point and the coplanar neighbor point, and calculate a second coordinate difference between the preset reference point and the collinear neighbor point;

perform coding on the first coordinate difference to obtain coplanar position information corresponding to the coplanar neighbor point, and perform coding on the second coordinate difference to obtain collinear position information corresponding to the collinear neighbor point; and establish the preset neighbor information table corresponding to the current point based on the coplanar position information and the collinear position information.

19. The decoder of claim 16, wherein in order to judge whether the neighbor point of the current point exists in the point cloud according to the target position information, the second processor is configured to:

obtain a point cloud sequence set of the point cloud;

perform a query process in the point cloud sequence set based on the target position information to obtain a query result; and determine that the neighbor point exists in response to that the query result is that the target position information exists in the point cloud sequence set.

20. The decoder of claim 19, wherein in order to perform the query process in the point cloud sequence set based on the target position information to obtain the query result, the second processor is configured to:

traverse the point cloud sequence set based on the target position information to obtain the query result.

* * * * *